(12) United States Patent
Kimura

(10) Patent No.: US 7,336,878 B2
(45) Date of Patent: Feb. 26, 2008

(54) OPTICAL DEVICE

(75) Inventor: Koichi Kimura, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 336 days.

(21) Appl. No.: 10/363,663

(22) PCT Filed: Dec. 7, 2001

(86) PCT No.: PCT/JP01/10747

§ 371 (c)(1),
(2), (4) Date: Mar. 5, 2003

(87) PCT Pub. No.: WO02/46807

PCT Pub. Date: Jun. 13, 2002

(65) Prior Publication Data

US 2003/0180022 A1     Sep. 25, 2003

(30) Foreign Application Priority Data

Dec. 8, 2000 (JP) ............................. 2000-374527

(51) Int. Cl.
*G02B 6/10* (2006.01)
(52) U.S. Cl. ...................... 385/129; 385/130; 385/131; 385/132
(58) Field of Classification Search ................ 385/129, 385/130, 131, 132
See application file for complete search history.

(56) References Cited

U.S. PATENT DOCUMENTS 5,074,646 A * 12/1991 Huang et al. ................ 359/572
5,126,880 A    6/1992 Wheatley et al.
6,208,466 B1 *  3/2001 Liu et al. .................... 359/584

FOREIGN PATENT DOCUMENTS

| EP | 0 170 439 A  | 2/1986  |
|----|--------------|---------|
| JP | 04-295804    | 10/1992 |
| JP | 07-005311    | 1/1995  |
| JP | 10-732       | 1/1998  |
| JP | 10-282492    | 10/1998 |
| JP | 10-282498 A  | 10/1998 |
| JP | 2000-321408  | 11/2000 |
| WO | WO 00/02084 A | 1/2000 |
| WO | WO 00/31572 A | 6/2000 |

OTHER PUBLICATIONS

International Search Report Mar. 19, 2002.

* cited by examiner

*Primary Examiner*—Jennifer Doan
(74) *Attorney, Agent, or Firm*—Sughrue Mion, PLLC

(57) ABSTRACT

The invention has an object to provide an optical device which can directly and efficiently introduce a planar incident light as it is and can efficiently obtain a planar total reflected light on a desirable interface without using a light guiding plate or an optical waveguide, and is constituted by a reflector having no absorption without depending on an incidence angle. The invention provides a planar optical device characterized by such a feature that when an incident light is introduced like a plane into the optical device, at least apart of the incident light thus introduced is totally reflected by an interface of layers constituting the optical device, while the incident light is not substantially emitted from an opposite side to an incident light introduction side.

126 Claims, 17 Drawing Sheets

FIG. 1
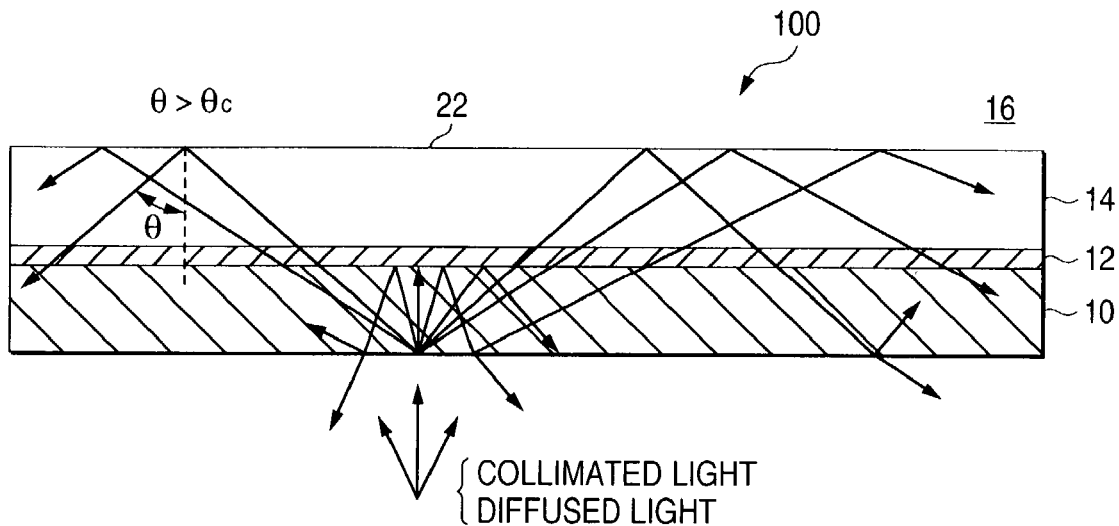
FIG. 2 (a) VOLUME HOLOGRAM
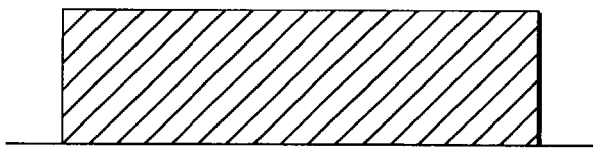
FIG. 2 (b) DIFFRACTION GRATING (RELIEF TYPE)
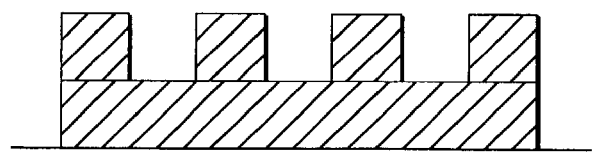
FIG. 2 (c) DIFFRACTION GRATING (REFRACTIVE INDEX MODULATION TYPE)

POROUS MEMBER

PLANAR INCIDENT LIGHT

PLANAR INCIDENT LIGHT

INCIDENT LIGHT

OPTICAL DEVICE

FIELD OF THE INVENTION

The present invention relates to a planar optical device for totally reflecting a planar incident light in a medium provided in the front part of an optical path for the incident light, and more particularly to a technique for efficiently introducing the light to be reflected totally in the medium.

BACKGROUNDS OF THE ART

For example, in a liquid crystal display, a light guiding plate for guiding the light of a back light over a whole display screen is provided on the back side of the display surface of a liquid crystal panel. In the light guiding plate of this kind, an incident light is introduced from the end face side of the light guiding plate or an optical waveguide and is totally reflected and propagated in the light guiding plate or the optical waveguide so that a planar total reflected light can be obtained efficiently.

Moreover, a reflector capable of carrying out an efficient reflection includes a film having a metal or a metallic surface. In addition, the reflector includes a multilayer film interference mirror such as a dielectric multilayer film mirror.

FIG. 31 shows a state in which an incident light is introduced from a general light guiding plate and waveguide according to the conventional art. FIG. 31(a) shows a state in which the incident light is introduced from the end face of the light guiding plate and is totally reflected and guided in the light guiding plate, and FIG. 31(b) shows a state in which a prism is provided on the end of the light guiding plate and the incident light is introduced through the prism and is totally reflected and guided in the light guiding plate. Moreover, FIG. 31(c) shows a state in which the incident light is introduced from the end of the waveguide formed on a substrate into the waveguide and is totally reflected and guided in the waveguide.

The light guiding plate and the waveguide satisfy total reflecting conditions in the light guiding plate and the waveguide by introducing the incident light at a greater angle than a total reflecting critical angle. Moreover, the light guiding plate and the waveguide have been expected to be developed into various optical devices or optical systems which utilize a total reflection in the future.

As described above, in the conventional method of introducing the incident light into the light guiding plate and the waveguide, the incident light is introduced from the end face side of the light guiding plate and the waveguide or is introduced through the prism connected to the end on either surface side of the light guiding plate. In the light guiding plate and the waveguide which are thin and plate-shaped, however, the incidence opening area of the end face is small and a coupling efficiency with the incident light tends to be deteriorated. Moreover, the light guiding plate and the waveguide have been desired to have a smaller thickness and a larger area, and the incidence opening area of the end face tends to be reduced increasingly. Consequently, there is a fear that the coupling efficiency might be deteriorated. Furthermore, the shape of the incident light (a light source) and an introducing position are restricted and the size and number of the light sources is limited so that a light having a high output cannot be introduced. Moreover, the incident light is to be beam-shaped or linear so that the type of the light source is restricted and an optical system for acquiring the shape described above is required.

In the case in which the reflector is a film having a metal or a metallic surface, moreover, an absorption is carried out at time of a reflection so that a light loss is always caused. In the case of the multilayer film interference mirror, a transmitted light is present when the incidence angle of the incident light is increased. For this reason, it is impossible to obtain a perfect reflector having a high efficiency for an optional incidence angle.

DISCLOSURE OF THE INVENTION

The invention has been made in consideration of the conventional problems and has an object to provide an optical device which can directly and efficiently introduce a planar incident light as it is and can efficiently obtain a planar total reflected light on a desirable interface without using a light guiding plate or an optical waveguide, and is constituted by a reflector having no absorption without depending on an incidence angle.

In order to attain the object, (1) the invention provides a planar optical device characterized by such a feature that when an incident light is introduced like a plane into the optical device, at least apart of the incident light thus introduced is totally reflected by an interface of layers constituting the optical device, while the incident light is not substantially emitted from an opposite side to an incident light introduction side.

The optical device has a planar shape, and when the incident light is incident like a plane on the optical device, at least a part of the incident light thus introduced is totally reflected by the interface of the layers constituting the optical device and is returned to the incident light introduction side, and the incident light introduced in the optical device is not substantially emitted from the opposite side to the incident light introduction side. Consequently, the shape of the incident light, the introducing position and the type of a light source are not restricted but the planar incident light can be introduced like a plane directly and efficiently so that a planar total reflected light can be obtained efficiently on a desirable interface. Moreover, it is possible to constitute a reflector having neither an incidence angle dependency nor an absorption. Furthermore, a light is not substantially transmitted from the optical device. Therefore, it is possible to enhance a light utilization efficiency and to increase an application range to an optical device and an optical system which utilize a total reflection.

(2) The invention provides a planar optical device characterized in that an optical element for changing an optical path is provided in the optical device, and at least a part of a planar incident light introduced in the optical device is introduced into the optical element for changing an optical path and the substantially whole incident light thus introduced is totally reflected by an interface of layers constituting the optical device.

In the optical device, the optical element for changing an optical path for the incident light is provided in the optical device and the incident light is introduced like a plane into the optical element for changing an optical path. The optical path for the planar incident light thus introduced is changed into a specific direction or an optional direction by the optical element for changing an optical path, and the substantially whole incident light is reflected through a total reflection by the interface of the layers constituting the optical device. Therefore, the shape of the incident light, the introducing position and the type of a light source are not restricted but the planar incident light can be introduced like a plane directly and efficiently so that the planar total reflected light can be obtained efficiently on a desirable interface. Moreover, it is possible to constitute a reflector having neither an incidence angle dependency nor an absorption. Furthermore, a light is not substantially transmitted from the optical device. Therefore, it is possible to enhance a light utilization efficiency and to increase an application range to an optical device and an optical system which utilize a total reflection.

(3) The invention provides a planar optical device characterized in that an optical element for selecting an optical path is provided in the optical device, and at least a part of a planar incident light introduced in the optical device is introduced into the optical element for selecting an optical path and the substantially whole incident light thus introduced is totally reflected through a total reflection by an interface of layers constituting the optical device.

In the optical device, the optical element for selecting an optical path for the incident light is provided in the optical device and the incident light is introduced like a plane into the optical element for selecting an optical path. The optical path for the planar incident light thus introduced is changed into a specific direction or an optional direction by the optical element for selecting an optical path, and the substantially whole incident light is reflected through a total reflection by the interface of the layers constituting the optical device. Therefore, the shape of the incident light, the introducing position and the type of a light source are not restricted but the planar incident light can be introduced like a plane directly and efficiently so that the planar total reflected light can be obtained efficiently on a desirable interface. Moreover, it is possible to constitute a reflector having neither an incidence angle dependency nor an absorption. Furthermore, a light is not substantially transmitted from the optical device. Therefore, it is possible to enhance a light utilization efficiency and to increase an application range to an optical device and an optical system which utilize a total reflection.

(4) The invention provides a planar optical device characterized in that an optical element for changing an optical path and an optical element for selecting an optical path are provided in this order from an incident light introduction side in a direction of a thickness of the optical device, and when an incident light is introduced like a plane into the optical element for changing an optical path, at least a part of the incident light thus introduced is introduced into the optical element for selecting an optical path and the substantially whole incident light thus introduced is reflected through a total reflection by an interface of layers constituting the optical device.

In the optical device, the optical element for changing an optical path and the optical element for selecting an optical path are provided in this order from the incident light introduction side in the direction of the thickness of the optical device, and the incident light is introduced like a plane into the optical element for changing an optical path. The optical path for the incident light thus introduced is changed into a specific direction or an optional direction by the optical element for changing an optical path, and furthermore, only the incident light in the specific direction is transmitted by the optical element for selecting an optical path. Consequently, the substantially whole light introduced in the optical device is reflected through a total reflection by the interface of the layers constituting the optical device. Therefore, the shape of the incident light, the introducing position and the type of a light source are not restricted but the planar incident light can be introduced like a plane directly and efficiently so that the planar total reflected light can be obtained efficiently on a desirable interface. Moreover, it is possible to constitute a reflector having neither an incidence angle dependency nor an absorption. Furthermore, a light is not substantially transmitted from the optical device. Therefore, it is possible to enhance a light utilization efficiency and to increase an application range to an optical device and an optical system which utilize a total reflection.

(5) The invention provides the optical device, wherein the substantially whole incident light which is reflected totally is returned to the incident light introduction side of the optical device.

In the optical device, the substantially whole incident light which is reflected totally is returned to the incident light introduction side of the optical device. In the medium having a total reflecting surface, therefore, light guiding, storage and containment are not substantially carried out.

(6) The invention provides the optical device, wherein the layer constituting the optical device is not substantially absorbed into a wavelength area of the incident light.

In the optical device, the layer constituting the optical device is not substantially absorbed into the wavelength area of the incident light. Therefore, it is possible to suppress the incident light and the loss of the incident light reflected totally, thereby obtaining an efficient optical device.

(7) The invention provides the optical device, wherein the optical element for changing an optical path and the optical element for selecting an optical path are provided in optical contact with each other.

In the optical device, the optical element for changing an optical path and the optical element for selecting an optical path are provided in optical contact with each other. Consequently, both light coupling properties can be enhanced. In addition, in the case in which the optical element for changing an optical path has a directivity, it is possible to introduce the incident light from the optical element for changing an optical path into the optical element for selecting an optical path with an incidence angle component held.

(8) The invention provides the optical device, wherein the optical element for changing an optical path and the optical element for selecting an optical path are provided in optical contact with each other through a medium having a greater refractive index than 1.

In the optical device, the optical element for changing an optical path and the optical element for selecting an optical path are provided in optical contact with each other through a medium having a greater refractive index than 1. Consequently, it is possible to introduce the incident light from the optical element for changing an optical path into the optical element for selecting an optical path without generating a total reflection by an interface with the medium.

(9) The invention provides the optical device, further comprising a transparent medium constituting a part of the optical device, the optical element for changing an optical path being provided in a front part of an optical path of the transparent medium.

In the optical device, the incident light is transmitted through the transparent medium and is then introduced into the optical element for changing an optical path so that only the incident light in a specific direction is transmitted.

(10) The invention provides the optical device, further comprising a transparent medium constituting a part of the optical device, the optical element for selecting an optical path being provided in a front part of an optical path of the transparent medium.

In the optical device, the incident light is transmitted through the transparent medium and is then introduced into the optical element for selecting an optical path so that only the incident light in a specific direction is transmitted.

(11) The invention provides the optical device, further comprising a transparent medium constituting a part of the optical device, the optical element for changing an optical path and the optical element for selecting an optical path being provided in this order in a front part of an optical path of the transparent medium.

In the optical device, the incident light is transmitted through the transparent medium and is then introduced into the optical element for changing an optical path, and the optical path for the incident light is changed into a specific direction or an optional direction, and furthermore, is introduced into the optical element for selecting an optical path so that only the incident light in the specific direction is transmitted.

(12) The invention provides the optical device, wherein a medium constituting a part of the optical device is provided in a frontmost part of the optical path of the optical device, and a front or rear interface of an optical path for an incident light of the medium is set to be an interface generating the total reflection.

In the optical device, a medium constituting a part of the optical device is provided in the frontmost part of the optical path of the optical device, and the incident light is totally reflected by the front or rear interface of the optical path for the incident light of the medium.

(13) The invention provides the optical device, wherein, for the interface generating the total reflection, a rear part of the optical path for the incident light is selected with na>nb if $\sin^{-1} (nb/na) \leq \theta$ is set, and a front part of the optical path for the incident light is selected with na>nb if $\sin^{-1} (1/na) < \theta < \sin^{-1} (nb/na)$ is set, and the front part of the optical path for the incident light is selected with na≤nb if $\sin^{-1} (1/na) \leq \theta$ is set, in which nb represents a mean refractive index of the medium, na represents a mean refractive index of a layer provided in the rear part of the optical path of the medium, and θ represents an angle of a light advancing in the layer of the rear part of the optical path.

In the optical device, it is possible to control the interface generating the total reflection by regulating the mean refractive index of the medium for the mean refractive index of the layer in the rear part of the optical path. Thus, it is possible to set a total reflecting surface corresponding to the situation of use of the optical device.

(14) The invention provides the optical device, wherein the interface generating the total reflection is set to be an interface of a medium having a first refractive index constituting a part of the optical device and a medium provided in a front part of the optical path for the incident light in contact with the medium and having a second refractive index which is smaller than the first refractive index.

In the optical device, the total reflection is generated at a predetermined incidence angle based on a difference in a refractive index on the interface of the medium having the first refractive index constituting a part of the optical device and the medium provided in the front part of the optical path for the incident light in contact with the medium and having the second refractive index which is smaller than the first refractive index.

(15) The invention provides the optical device, wherein the interface generating the total reflection is a frontmost surface of the optical path for the incident light of the optical device.

In the optical device, the total reflection is generated on the front most surface of the optical path for the incident light of the optical device. In this case, the frontmost surface may be a thin layer having a low refractive index.

(16) The invention provides the optical device, wherein the interface generating the total reflection has a forward side of the optical path for the incident light to be an air contact interface.

In the optical device, the forward side of the optical path for an incident light comes in contact with a gas such as air or an in active gas. Therefore, it is possible to generate the total reflection with a simple structure without providing a layer having a low refractive index which forms the total reflecting surface. Moreover, the frontmost surface of the optical path for the incident light of the optical device can be set to be the total reflecting surface.

(17) The invention provides the optical device, wherein the optical element for changing an optical path includes and forward outputs a light having an angle θt to satisfy at least a condition of sin θt>nw/nt, in which nt represents a mean refractive index of the optical element for changing an optical path, nw represents a refractive index of a medium on a forward side of a total reflecting interface in a front part of the optical path, and θt represents an angle of a light advancing in a medium of the optical element for changing an optical path.

In the optical device, the light having an angle θt to satisfy at least a condition of sin θt>nw/nt is transmitted through the optical element for changing an optical path and the optical path is changed to output the same light forward.

(18) The invention provides the optical device, wherein the optical element for changing an optical path serves to change the optical path by a refraction.

In the optical device, the optical element for changing an optical path changes the optical path for the incident light by the refraction. Consequently, it is possible to introduce the incident light into the optical device without substantially reducing the intensity of the incident light.

(19) The invention provides the optical device, wherein the optical element for changing an optical path is any of a lens array, a prism array and a heterorefractive index distribution member having various refractive indices distributed.

In the optical device, it is possible to reduce the cost, and at the same time, to display an excellent performance by properly selecting the optical element including the lens array, the prism array or the heterorefractive index distribution member which is suitable for mass production.

(20) The invention provides the optical device, wherein the optical element for changing an optical path serves to change the optical path by a diffraction.

In the optical device, the optical element for changing an optical path changes the optical path for the incident light through a diffraction by a transmission type diffraction grating. Consequently, the incident light can be introduced into the optical device at an incidence angle with high precision.

(21) The invention provides the optical device, wherein the optical element for changing an optical path is any of a volume hologram, a phase modulation type diffraction grating and an amplitude modulation type diffraction grating.

In the optical device, mass transfer production can be carried out by a photopolymer method or an injection molding method, for example. Consequently, the cost of the optical device itself can be reduced.

(22) The invention provides the optical device, wherein the optical element for changing an optical path serves to change an optical path by a light diffusion.

In the optical device, the optical element for changing an optical path serves to change an optical path by the light diffusion. Consequently, the incident light can be incident on the optical device in an optical direction.

(23) The invention provides the optical device, wherein the optical element for changing an optical path is a porous member, a heterorefractive index distribution member, a dispersion member or a diffusion member having a concavo-convex surface.

In the optical device, it is possible to reduce the cost, and at the same time, to display an excellent performance by properly selecting the optical element to be the porous member, the heterorefractive index distribution member, the dispersion member or the diffusion member which is suitable for mass production.

(24) The invention provides the optical device, wherein the optical element for changing an optical path serves to change an optical path by a light reflection.

In the optical device, the optical element for changing an optical path changes the optical path by the light reflection. Consequently, the incident light can be incident on the optical device in an optional direction.

(25) The invention provides the optical device, wherein the optical element for selecting an optical path has such a feature that a substantially whole transmitted light which is emitted from the optical element has a greater angle component than a total reflecting critical angle on an interface of layers in a front part of an optical path for the incident light from the optical element for selecting an optical path or an interface in a front part of the optical path for the incident light of the optical element for selecting an optical path and incident lights having other angle components are selectively reflected and are not transmitted.

In the optical device, the optical element for selecting an optical path has such a feature that a substantially whole transmitted light which is emitted from the optical element has a greater angle component than a total reflecting critical angle on an interface of layers in a front part of an optical path for the incident light from the optical element for selecting an optical path or an interface in a front part of the optical path for the incident light of the optical element for selecting an optical path and incident lights having other angle components are selectively reflected by the optical element for selecting an optical path. Accordingly, only the incident light having an incidence angle component to be reflected totally on the interface in the front part of the optical path for the incident light is selectively transmitted through the optical element for selecting an optical path, and the incident light having such an incidence angle component as not to be reflected totally is not transmitted.

(26) The invention provides the optical device, wherein the optical element for selecting an optical path transmits a substantially whole light having an angle $\theta s$ to satisfy a condition of $\sin \theta s > nw/ns$, in which ns represents a mean refractive index of the optical element for selecting an optical path, nw represents a refractive index of a medium on a forward side of a total reflecting interface in a front part of the optical path, and $\theta s$ represents an angle of a light advancing in the medium of the optical element for selecting an optical path.

In the optical device, the substantially whole light having an angle $\theta s$ to satisfy a condition of $\sin \theta s > nw/ns$ is transmitted through the optical element for selecting an optical path and other lights are reflected. Consequently, only a specific light component is selectively transmitted.

(27) The invention provides the optical device, wherein the optical element for selecting an optical path has a function of selectively carrying out a reflection for a wavelength area of an incident light, and a wavelength of the incident light to be reflected selectively is shifted toward a short-wavelength side when an incidence angle of the incident light on the optical element for selecting an optical path is reduced with respect to a surface of the optical element.

In the optical device, the optical element for selecting an optical path has the function of selectively carrying out a reflection for the wavelength area of the incident light, and the wavelength of the incident light to be reflected selectively is shifted toward the short-wavelength side when the incidence angle of the incident light on the optical element is reduced with respect to the surface of the optical element. By utilizing such a property, it is possible to design the optical element for selecting an optical path such that only an incident light having a predetermined incidence angle component is transmitted, thereby selectively extracting only an incident light having an incidence angle component generating a total reflection.

(28) The invention provides the optical device, wherein when an incidence angle of the incident light on a total reflecting interface in a front part of an optical path for the incident light in the optical element for selecting an optical path is equal to or smaller than a total reflecting critical angle, the optical element for selecting an optical path selectively reflects the substantially whole incident light.

In the optical device, when the incidence angle of the incident light on the optical element for selecting an optical path and an incidence angle on the total reflecting interface in the front part of the optical path for the incident light to be changed depending on the refraction conditions of each layer are equal to or smaller than the total reflecting critical angle on the total reflecting interface, the optical element for selecting an optical path selectively reflects the substantially whole incident light. Consequently, the incident light having such an angle component as not to be reflected totally is selectively reflected over the total reflecting interface and is not transmitted forward in the optical path.

(29) The invention provides the optical device, wherein the optical element for selecting an optical path is a light interference filter including a dielectric multilayer film.

In the optical device, it is possible to form an optional wavelength selecting reflective film with a large area and a simple structure by using the light interference filter including the dielectric multilayer film. By utilizing the incidence angle dependency of the reflecting wavelength, it is possible to easily form the optical element for selecting an optical path.

(30) The invention provides the optical device, wherein the optical element for selecting an optical path is a Bragg reflecting filter including a cholesteric liquid crystal and a volume hologram.

In the optical device, it is possible to form the optical element for selecting an optical path at a low cost by using the Bragg reflecting filter including the cholesteric liquid crystal and the volume hologram.

(31) The invention provides a planar optical device characterized in that an optical element for introducing an incident light is provided in the optical device, and when the incident light is introduced like a plane into the optical element for introducing the incident light, the substantially whole incident light thus introduced is reflected through a total reflection by an interface of layers constituting the optical device.

In the optical device, the optical element for introducing the incident light to be reflected totally by the interface of the layers constituting the optical device is provided in the optical device, and the incident light is introduced like a plane into the optical element for introducing the incident light. The substantially whole incident light thus introduced is reflected through a total reflection by the interface of the layers constituting the optical device. Consequently, it is possible to exactly introduce the planar incident light directly and efficiently with a simple structure without introducing the incident light from the end face of the optical device at a greater angle than the total reflecting critical angle and to increase the output of the optical device. Moreover, since the substantially whole incident light thus introduced is reflected by the total reflection having no reflection loss, the optical device can be caused to function as a reflector having a high efficiency.

(32) The invention provides the optical device, wherein the optical element for introducing an incident light is a prism array arranged like a plane.

In the optical device, the planar incident light in a predetermined direction is converted to have such an angle as to generate the total reflection in the optical device by the prism array. Consequently, it is possible to introduce the incident light to be reflected totally into the optical device.

(33) The invention provides the optical device, wherein the incident light is a collimated light ranging within a specific incidence angle.

In the optical device, the incident light is the collimated light ranging within the specific incidence angle. Consequently, it is possible to supply the incident light having a specific incidence angle component to the optical device, thereby enhancing a light utilization efficiency.

(34) The invention provides the optical device, wherein the incident light is a collimated light having a plurality of incidence angles.

In the optical device, the incident light is the collimated light having a plurality of incidence angles. Therefore, the incident light having a plurality of incidence angle components can be supplied to the optical device at a time.

(35) The invention provides the optical device, wherein the incident light is a diffused light having an optional incidence angle.

In the optical device, the incident light is the diffused light having an optional incidence angle. Consequently, the incident light can be introduced into the optical device in various directions so that the uniformity of the incident light can be enhanced.

(36) The invention provides the optical device, wherein a light source is provided in the optical device and the incident light is emitted from the light source.

In the optical device, the light source is provided in the optical device. Consequently, a light emitted from the light source can be directly introduced into the optical device so that a loss can considerably be reduced during the introduction of the incident light.

(37) The invention provides the optical device, wherein the incident light is incident from an outside of the optical device.

In the optical device, the incident light is introduced from the outside of the optical device. Consequently, the degree of freedom of a design of the optical device can be enhanced and a large-sized light source can also be utilized so that an output can easily be increased.

(38) The invention provides the optical device, wherein a reflector for transmitting, toward the optical device side again, a light which is once incident on the optical device and is reflected by the optical device is provided opposite to an incident light introduction side of the optical device.

In the optical device, the reflector is provided opposite to the incident light introduction side of the optical device. Consequently, the light which is once incident on the optical device and is reflected by the optical device is irradiated on the reflector, and furthermore, the light reflected by the reflector is transmitted again toward the optical device side. Consequently, the light is recycled so that a light utilization efficiency can be enhanced and an increase in the efficiency can be obtained.

(39) The invention provides the optical device, wherein the incident light is any of a UV light, a visible light and an infrared light.

In the optical device, the incident light is set into the wavelength area of any specific band of the UV light, the visible light and the infrared light. Consequently, the incident light can reliably be transmitted or reflected selectively in the optical device.

(40) The invention provides the optical device, wherein the incident light is emitted from any of a discharge lamp, a laser beam source, an LED, an inorganic or organic EL, an incandescent lamp, a cathode-ray lamp and an FED.

In the optical device, the incident light is emitted from the discharge lamp so that a light source to be used generally can be utilized as it is, the incident light is emitted from the laser beam source so that a collimated light can easily be obtained, the incident light is emitted from the LED so that a cost can be reduced and a light emitting wavelength area can be preset, the incident light is emitted from the inorganic or organic EL so that planar light emission is obtained, the incident light is emitted from the incandescent lamp so that an optional wavelength component can be fetched by filtering to answer the purpose, and the incident light is emitted from the cathode-ray lamp or the FED so that a planar light can be obtained directly.

BRIEF DESCRIPTION OF THE DRAWINGS

FIG. 1 is a view showing a schematic structure according to a first embodiment of an optical device according to the invention.

FIGS. 2(a) to 2(c) show the views showing a transmission type diffraction grating, 2(a) showing a volume hologram, 2(b) showing a relief type diffraction grating and 2(c) showing a refractive index modulation type diffraction grating.

Figure 3:
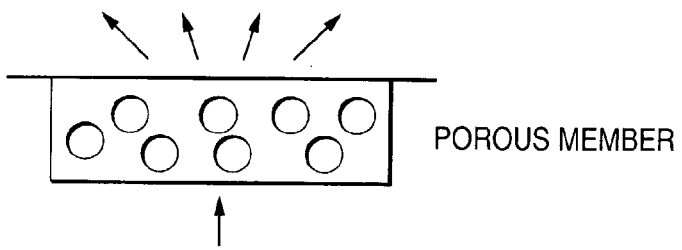
FIGS. 3(a) to 3(c) show the views showing a light diffusion and a light diffusing plate utilizing the light diffusion, 3(a) showing a porous member, 3(b) showing a heterorefractive index dispersion member and distribution member in which materials having different refractive indices are distributed and dispersed, and 3(c) showing a light diffusion member having a concavo-convex surface.
Figure 3:
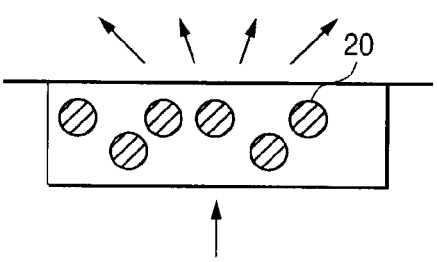
Figure 3:
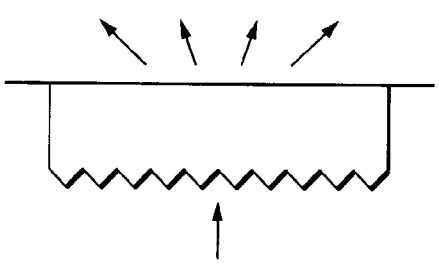

In the drawings, 10 denotes an optical element for changing an optical path, 12 denotes an optical element for selecting an optical path, 14 denotes a transparent medium, 16 denotes a transparent medium (air), 20 denotes a substance having a different refractive index, 22 denotes an interface, 26 denotes a transparent electrode, 28 denotes an oriented layer, 30 denotes a cholesteric liquid crystal layer, 32 denotes an intermediate transparent medium, 34 and 35 denote a transparent medium, 36 denotes an optical connecting medium, 38 denotes a medium, 40 denotes a reflector, 42 denotes a light source, 44 denotes a transparent base material, 46 denotes a transmission type refractive grating, 48 denotes a medium, 50 denotes a microprism array, 52 denotes a total reflecting surface, 54 denotes a prism, 56 denotes a transparent medium, 58 denotes a total reflecting surface, 60 denotes a transparent base material, 62 denotes a transmission type diffraction grating, 100, 200, 300, 400, 500, 600, 700, 800, 900, 1000, 1100, 1200 and 1300 denote an optical device, A and B denote an optical path, n denotes a refractive index (a mean refractive index), n1 denotes a refractive index of the transparent medium 14, n2 denotes a refractive index of the transparent medium 16, n3 denotes a refractive index of the optical element 12, n4 denotes a refractive index of the transparent medium 34, n5 denotes a refractive index of the medium 38, n7 denotes a refractive index of the microprism array 50, n8 denotes a refractive index of the transparent medium 56, ne denotes an extraordinary index, no denotes an ordinary index, P denotes a spiral pitch, T denotes a spectral transmittance, α denotes a vertical angle, Δn denotes a double refractive index, Δλ denotes a reflecting wavelength width, θ, $\theta_0$, $\theta_1$, $\theta_2$ and $\theta_3$ denote an incidence angle, $\theta_c$ denotes a total reflecting critical angle, and λ denotes a wavelength.

BEST MODES FOR CARRYING OUT THE INVENTION

Preferred embodiments of an optical device according to the invention will be described below in detail with reference to the drawings.

FIG. 1 shows a schematic structure according to a first embodiment of the optical device of the invention. An optical device 100 according to the embodiment has a multilayer structure in which an optical element 10 for changing an optical path, an optical element 12 for selecting an optical path and a transparent medium 14 are provided in this order from the introduction side of an incident light. A transparent medium 16 is present in the front part of the optical path of the transparent medium 14 in the optical device 100, and the relationship between a refractive index n1 (a first refractive index) of the transparent medium 14 and a refractive index n2 (a second refractive index) of the transparent medium 16 is set to satisfy total reflecting conditions on an interface 22 of the transparent medium 14 and the transparent medium 16. More specifically, the transparent medium 14 can be constituted by a glass substrate (n1=1.5) and the transparent medium 16 can be constituted as air (n2=1.0), for example. Each layer constituting the optical device 100 is not substantially absorbed into the wavelength area of the incident light but suppresses the incident light and the loss of the incident light which is totally reflected by the interface 22, thereby constituting an optical device having a high efficiency.

The optical element 10 for changing an optical path serves to change the optical path by utilizing a refraction, a diffraction, a light diffusion and a light reflection, and the following kinds of optical elements can be used as an example. In the case in which the refraction is to be utilized, a lens array, a prism array and a refractive index dispersion member can be used and the intensity of the incident light is not reduced substantially. In the case in which the diffraction is to be utilized, a transmission type diffraction grating shown in FIG. 2 is used, and a phase modulation type diffraction grating such as a volume hologram (see FIG. 2(a)), a relief type diffraction grating (see FIG. 2(b)) or a refractive index modulation type diffraction grating (see FIG. 2(c)) and an amplitude modulation type diffraction grating can be used to set the angle of an optical path for an incident light with high precision. Each optical element can be mass-transferred and produced by a photopolymer method or an injection molding method, for example.

In the case in which the light diffusion is to be utilized, moreover, a light diffusing plate shown in FIG. 3 is used and examples thereof include a porous member (see FIG. 3(a)), a heterorefractive index distribution member and dispersion member in which a material 20 having a different refractive index is distributed and dispersed (see FIG. 3(b)), and a light diffusion member or scattering member having a concavo-convex surface (see FIG. 3(c)). In the case in which the light reflection is to be utilized, a distribution member of a microreflector to carry out a reflection in an optional direction is used. Any optical element is suitable for mass production so that a cost can easily be reduced.

In the optical element 12 for selecting an optical path, the substantially whole selected and transmitted light emitted from the optical element 12 has a greater angle component than a total reflecting critical angle in a layer provided in the front part of an optical path for an incident light, and incident lights having other angle components are selectively reflected and are not transmitted. More specifically, only an incident light having a greater angle component than a total reflecting critical angle $\theta_c$ to be such a condition as to generate a total reflection on an interface of the transparent medium 14 and the transparent medium 16 is transmitted through the optical element 12 for selecting an optical path and incident lights having other angle components are shielded. The total reflecting critical angle $\theta_c$ is calculated by an equation (1).

$$\theta_c = \sin^{-1}(n2/n1) \tag{1}$$

Figure 4:
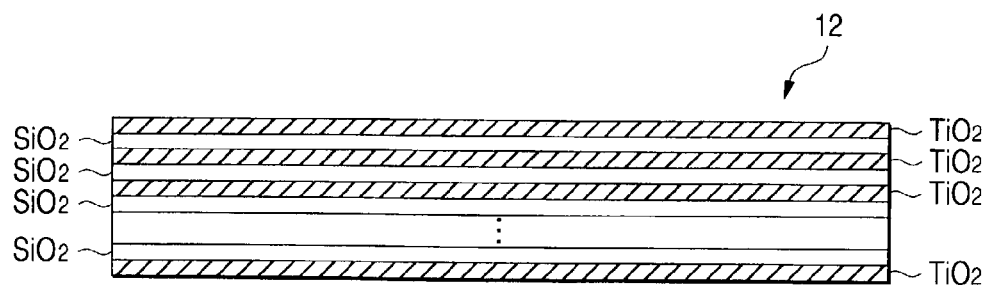
FIG. 4 is a view showing the layer structure of a light interference filter.

Specific examples of the optical element 12 for selecting an optical axis include a light interference filter comprising a dielectric multilayer film. FIG. 4 shows the layer structure of the light interference filter.

The light interference filter is a dielectric multilayer film constituted by sequentially providing $TiO_2$ and $SiO_2$, and an optical characteristic thereof has the function of selectively reflecting an incident light based on a wavelength thereof which will be described below in detail, and has such a characteristic that a wavelength to be selectively reflected depending on an incidence angle is shifted toward the short-wavelength side. When the wavelength area of the incident light is represented by $\lambda_{iS}$ to $\lambda_{iL}$ ($\lambda_{iS}<\lambda_{iL}$), all substantial incident lights having the wavelength areas $\lambda_{iS}$ to $\lambda_{iL}$ are selectively reflected for a light including an angle component having the output angle of the selected and transmitted light emitted from the optical element 12 which is equal to or smaller than the total reflecting critical angle $\theta_C$. According to the structure, an optional wavelength selecting reflective film can be formed with a large area and a simple structure, and the optical element 12 for easily selecting an optical path can be formed by utilizing the incidence angle dependency of the reflection wavelength. The light interference filter may be a metal/dielectric multilayer film in which a metal film is added to the layer structure of the dielectric multilayer film. The light interference filter comprising the dielectric multilayer film can be formed by providing, as films, a plurality of thin film materials on a transparent support substrate by EB evaporation (electron beam coevaporation) or sputtering. Moreover, the thin film material may be an organic multilayer film having a different refractive index or an inorganic multilayer film containing an inorganic matter, and can be formed at a lower cost by coating or laminating in this case.

Detailed description will be given to the optical element for changing an optical path and the optical property of the optical element for selecting an optical path.

Figure 5:
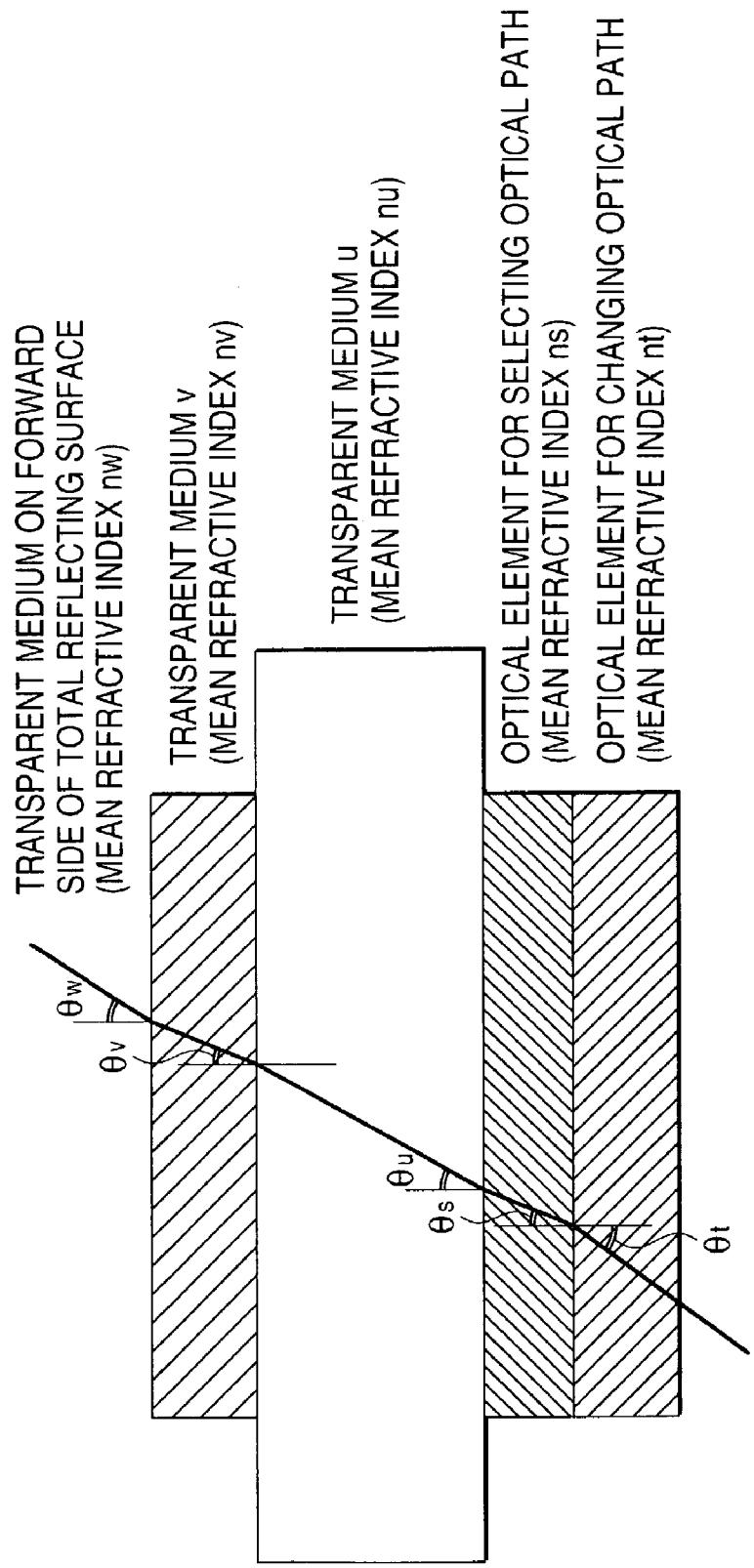
FIG. 5 is a view for explaining the optical property of the optical device.

First of all, there will be supposed the case in which the optical element for changing an optical path serves to change the optical path by a refraction, for example. As shown in FIG. 5, in the case of an optical device in which an optical element for changing an optical path (a mean refractive index nt), an optical element for selecting an optical path (a mean refractive index ns), a transparent medium u (a mean refractive index nu), a transparent medium v (a mean refractive index nv), and a transparent medium w on the forward side of a total reflecting surface (a mean refractive index nw) are provided in this order, the relationship between an incidence angle on each interface and the mean refractive index of each medium is represented as follows if the interface of the transparent medium v and the transparent medium w is a total reflecting surface.

$nv \cdot \sin \theta v = nw$ $nu \cdot \sin \theta u = nv \cdot \sin \theta v = nw$ $ns \cdot \sin \theta s = nu \cdot \sin \theta u = nw$ $nt \cdot \sin \theta t = ns \cdot \sin \theta s = nw$ wherein $\theta t$, $\theta s$, $\theta u$ and $\theta v$ represent an optical path angle in each medium. Accordingly, it is necessary to include at least a light having an angle $\theta t$ to satisfy the following condition as the condition of the optical element for changing an optical path and to output the light in a forward direction.

$\sin \theta t > nw/nt$

Preferably, the light having the angle $\theta t$ to satisfy the condition is included as much as possible and is output in the forward direction. If the transparent medium w is air, nw=1 is obtained and the condition described above is set as follows.

$\sin \theta t > 1/nt$

On the other hand, the condition of the optical element for selecting an optical path is set to transmit only a light satisfying the following condition.

$\sin \theta s > nw/ns$

If the transparent medium w is the air, nw=1 is obtained and the condition described above is set as follows.

$\sin \theta s > 1/ns$

A light to be irradiated like a plane is used for an incident light on the optical device 100, and any of a collimated light and a diffused light can be used. Moreover, the light may be incident from the outside of the optical device and may be incident to have a light source therein. In the case of the collimated light, an incident light having a specific incidence angle component can be supplied to the optical device 100 and a light utilization efficiency can be enhanced. On the other hand, in the case of the diffused light, the incident light can be introduced into the optical device 100 in various directions and an optional plane light source taking a low cost can be used. In the case in which a light source is provided on the inside, moreover, a light emitted from the light source is directly introduced into the optical device 100 and the optical device and the light source can be formed integrally so that a size and a thickness can be reduced and a light introduction efficiency can be enhanced. On the other hand, in the case in which the light source is provided on the outside, the degree of freedom of a design of the optical device 100 can be enhanced and an optional external plane light source having a large size can also be utilized so that an output can easily be increased.

Figure 6:
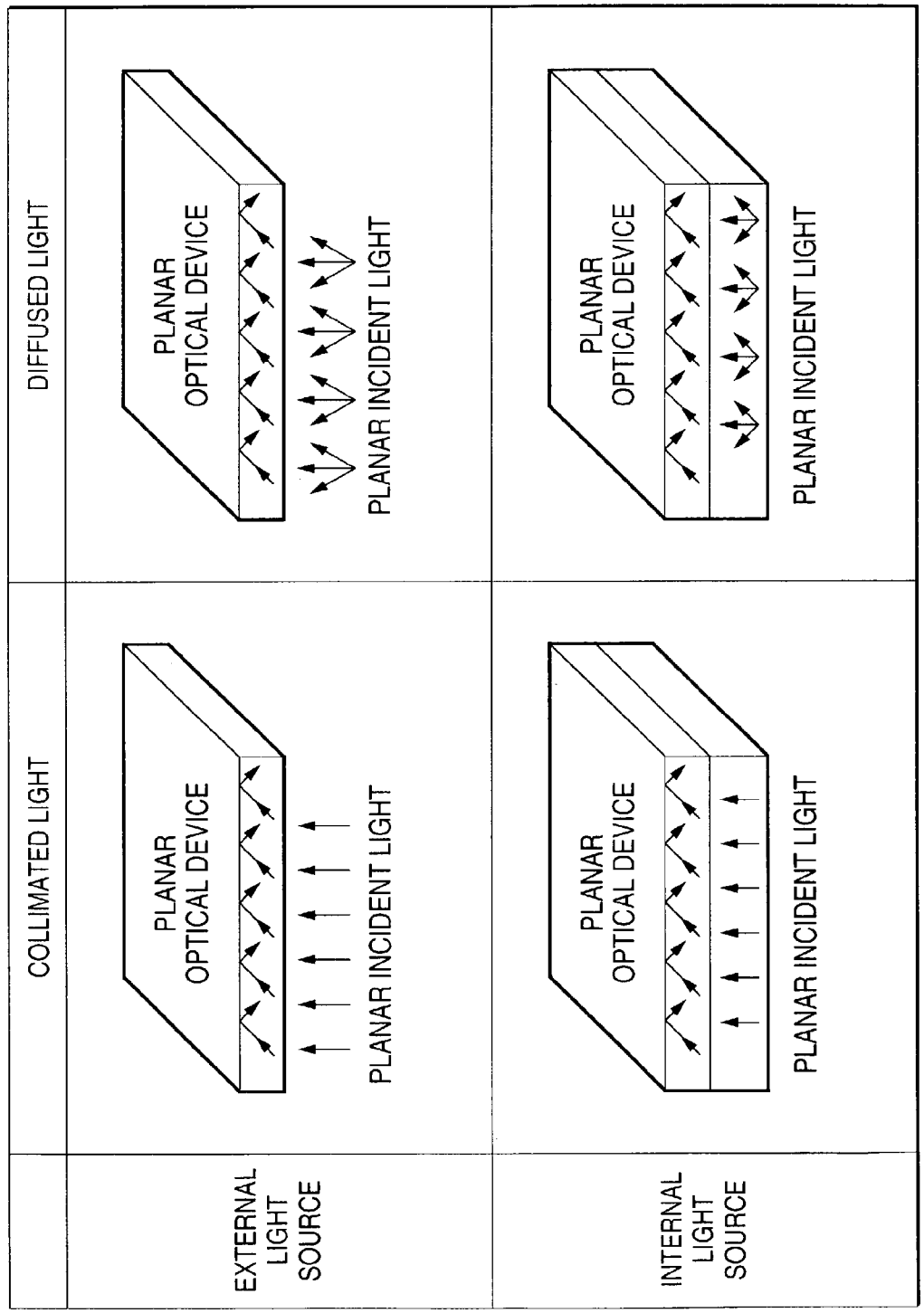
FIG. 6 is a view collectively showing the configuration of an incident light.

FIG. 6 collectively shows the configurations of the incident light. As shown in FIG. 6, it is possible to use, for the incident light, a collimated light ranging within a specific incidence angle or having one or more incidence angles or a diffused light to be an incident light in an optional direction. Moreover, it is possible to use, for each of the collimated light and the diffused light, a light which is incident like a plane from the outside of the optical device in the front part of the optical path of the optical device using the optical device and the light source separately or a light which is integrated in such a state as to provide a light source in the front part of the optical path of the optical device and is incident like a plane.

It is possible to use, for the incident light, a light having a wavelength in a specific band, for example, a UV light, a visible light such as a blue light or a green light, and an infrared light. In the case in which the infrared light is used, particularly, the effect of blocking a heat wave can also be obtained. Therefore, it is possible to obtain a convenience such as the prevention of overheat in respect of practical use.

For the type of the light source, moreover, it is possible to use a discharge lamp which is generally used and can be exactly utilized, for example, a fluorescent lamp, a mercury lamp, a neon tube lamp or a Crookes tube to be an electronic tube which is charged with an inactive gas or a mercury vapor, a laser beam source from which a collimated light can easily be obtained, an LED which is inexpensive and has a defined wavelength area, an inorganic or organic EL from which a planar light can be obtained, an incandescent lamp capable of fetching an optical wavelength component by emitting and filtering a white light to answer the purpose, a cathode-ray lamp to be a cathode-ray display tube such as a CRT from which a planar light to be introduced into the optical device can be directly obtained and an FED (field emission display) to be a planar display tube from which a planar light can be directly obtained.

Next, the characteristic of the optical element 12 for selecting an optical path will be described in detail with reference to FIGS. 7 to 9.

Figure 7:
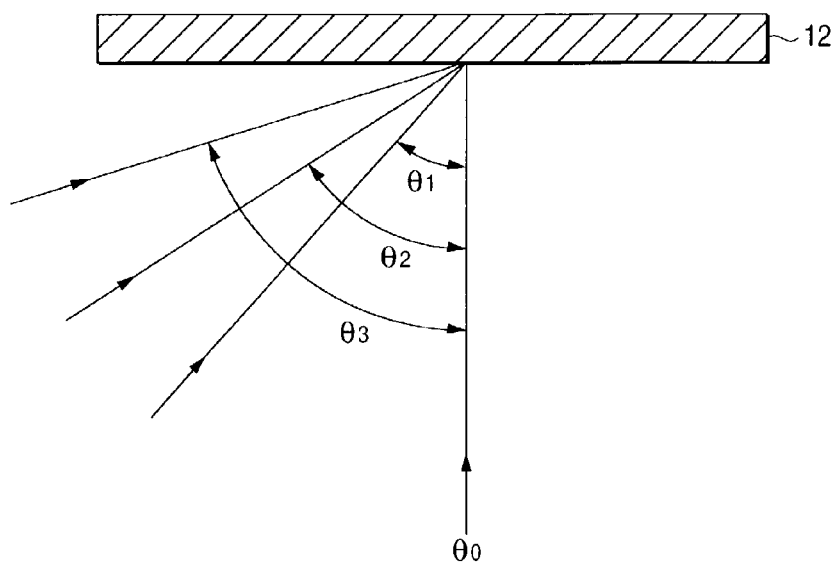
FIG. 7 is a view showing the incidence angle of a light incident on the optical element for selecting a light.
Figure 8:
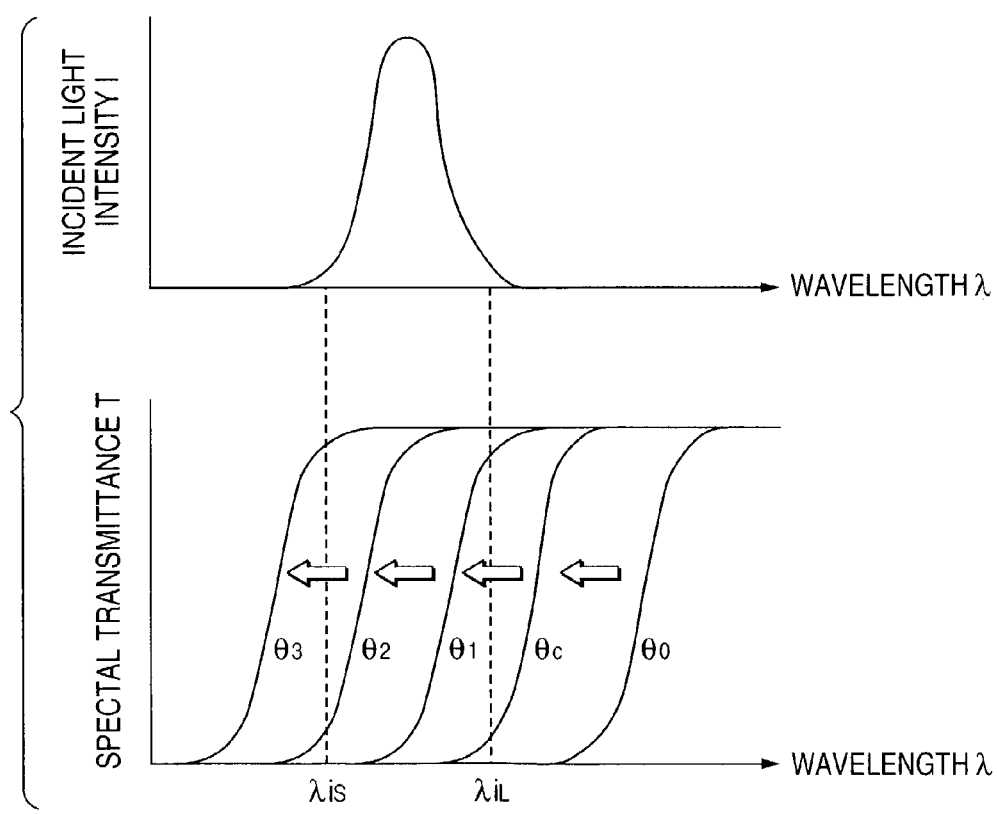
FIG. 8 is a graph showing, for each incidence angle, the spectral transmittance of the optical element for selecting an optical path with respect to the wavelength of the incident light.
Figure 9:
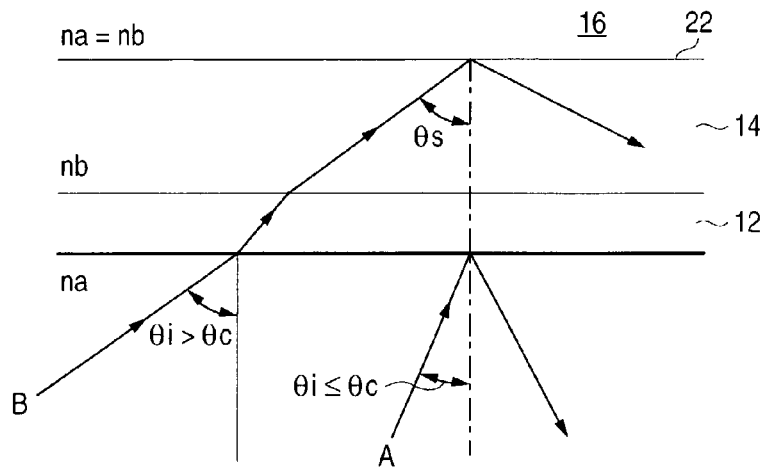
FIGS. 9(a) and 9(b) show the views showing an optical path in the optical element for selecting an optical path.
Figure 9:
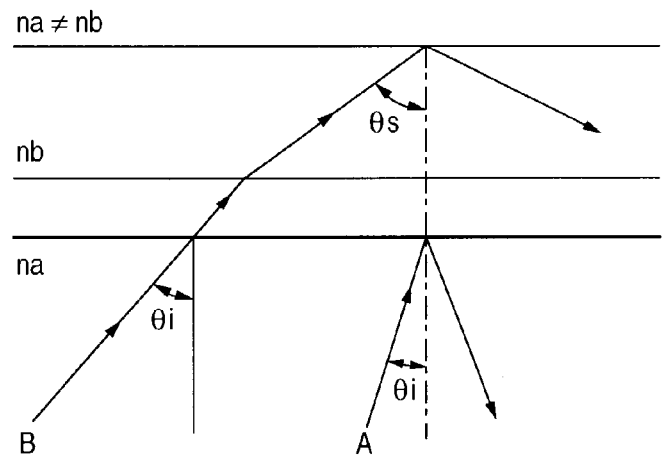

FIG. 7 shows the incidence angle of a light which is incident on the optical element 12, FIG. 8 is a graph showing, for each incidence angle, the spectral transmittance of the optical element 12 for the wavelength of an incident light, and FIG. 9 is a view showing an optical path on the inside and outside of the optical element 12.

First of all, there will be supposed the case in which a light is incident on the optical element 12 at incidence angles $\theta_0$, $\theta_1$, $\theta_2$ and $\theta_3$ as shown in FIG. 7. As shown in FIG. 8, the spectral transmittance of the optical element 12 is changed. More specifically, if the incidence angle is represented by $\theta_0$ (zero degree) which is equal to or smaller than a total reflecting critical angle $\theta_c$, the spectral transmittance is approximately 0% with respect to the wavelength areas $\lambda_{iS}$ to $\lambda_{iL}$ of the incident light so that a light shielding state (in which a light is not transmitted but reflected) is brought. On the other hand, if the incidence angle is greater than the total reflecting critical angle $\theta_c$, the transmitting characteristic of the spectral transmittance is shifted toward the short-wavelength side so that the amount of a transmitted light is increased when the incidence angle is increased in order of $\theta_1$, $\theta_2$ and $\theta_3$. In other words, when the incidence angle of the light incident on the optical element 12 for selecting an optical path is reduced with respect to the surface of the optical element 12, the wavelength of the incident light which is selectively reflected is shifted toward the short-wavelength side. Consequently, a light having an incidence angle component $\theta_0$ of the incident light is not transmitted and lights having greater incidence angle components $\theta_1$, $\theta_2$ and $\theta_3$ than a specific angle are transmitted with an increase in an amount in this order. Therefore, the optical element 12 is designed to have such a spectral characteristic that only a greater incident light component than a total reflecting critical angle $\theta_c$ on a predetermined interface is transmitted. Consequently, an incident light component which does not satisfy total reflecting conditions can be shielded and only an incident light component for a total reflection can be selectively emitted from the optical element 12.

With reference to FIG. 9, description will be given to an optical path for an incident light in the case in which the optical device 100 is constituted by using the optical element 12 designed to transmit only a greater incident light component than the total reflecting critical angle $\theta_C$ on the interface 22 as mentioned above.

FIG. 9(a) shows an optical path A in which a light incident on the optical element 12 for selecting an optical path is reflected by the optical element 12, and an optical path B in which the light incident on the optical element 12 for selecting an optical path is transmitted through the optical element 12 and is totally reflected by the interface 22 of the transparent medium 14 and the transparent medium 16 provided in the front part of the optical path.

The optical path A is used when an incidence angle $\theta_i$ of the incident light is equal to or smaller than the total reflecting critical angle $\theta_c$ on the interface 22, and the optical element 12 does not transmit a light having the incidence angle component but selectively reflects the same light by a surface thereof. For this reason, the light having an incidence angle component which is equal to or smaller than the total reflecting critical angle $\theta_c$ is shielded against the front part of the optical path by means of the optical element 12.

The optical path B is used when the incidence angle $\theta_i$ of the incident light is greater than the total reflecting critical angle $\theta_c$ on the interface 22, and the optical element 12 transmits a light having the incidence angle component. For this reason, the light having a greater incidence angle component than the total reflecting critical angle $\theta_c$ is transmitted through the optical element 12 and is introduced into the transparent medium 14, and is totally reflected by the interface 22.

FIG. 9(a) shows the case in which a refractive index na on the side on which the light is incident and a refractive index nb of the transparent medium 14 are equal to each other, and the incidence angle $\theta_i$ for the optical element 12 and the angle $\theta_s$ on the interface 22 are equal to each other.

On the other hand, FIG. 9(b) shows the case in which the refractive index na on the side on which the light is incident and the refractive index nb of the transparent medium 14 are different from each other, and the incidence angle $\theta_i$ for the optical element 12 and the incidence angle $\theta_s$ on the interface 22 are different from each other. In this case, the optical element 12 is designed such that the incidence angle $\theta_s$ on the interface 22 is greater than the total reflecting critical angle $\theta_c$.

The optical device 100 is constituted by using the optical element 12 for selecting an optical path which is designed as described above. Consequently, when a planar incident light comprising the collimated light or the diffused light introduced from the inside or outside of the optical device 100 is incident on the optical element 10 for changing an optical path as is indicated by an optical path shown in an arrow of FIG. 1, the optical path is changed through a diffusion from the irradiation position of the light. When a light having an optical path changed reaches the optical element 12 for selecting an optical path, only the incident light having a greater angle component than the total reflecting critical angle $\theta_c$ on the interface 22 of the transparent medium 14 and the transparent medium 16 is transmitted through the optical element 12 and incident lights having other angle components are reflected by the surface of the optical element 12 toward the light incident side.

Accordingly, only a light to be reflected totally by the interface 22 of the transparent medium 14 and the transparent medium 16 which is incident on the optical device 100 is introduced into the front part of the optical path, and the light thus introduced is totally reflected by the interface 22 to be a face in the frontmost part of the optical path for the incident light in the optical device 100. More specifically, in the optical element 12 for selecting an optical path, the substantially whole transmitted light emitted from the optical element 12 has a greater angle component than a total reflecting critical angle on an interface in the front part of the optical path for the incident light of the interface of layers provided in the front part of the light path for the incident light through the optical element 12 for selecting an optical path, and incident lights having other angle components are selectively reflected and are not transmitted. In a medium having a total reflecting surface, light guiding, storage and containment are not substantially carried out.

Moreover, a part of the light reflected toward the light incident side by the surface of the optical element 12 for selecting an optical path is reflected at the light incident side of the optical element 10 for changing an optical path, and is transmitted into the optical element 12 for selecting an optical path again. The light thus transmitted again has an incidence angle increased to be greater than the total reflecting critical angle $\theta_c$, and is thus transmitted through the optical element 12 and is introduced into the transparent medium 14.

According to the optical device 100 in accordance with the embodiment, thus, the incident light is directly and efficiently introduced like a plane from the planar light source into the optical device 100 without using a light guiding plate or an optical waveguide. As compared with the case in which the light is incident from the end face side, therefore, an introduction port for the incident light can be considerably enlarged and a coupling efficiency with the incident light can be enhanced so that a planar total reflected light can be obtained efficiently without an influence by a reduction in the thickness of the optical device 100 itself. Moreover, an increase in the output of the optical device 100 can be achieved easily. Furthermore, at least a part of the incident light introduced into the optical device by a reflector having no absorption without depending on an incidence angle is reflected by a total reflection having no reflection loss. Therefore, the optical device can be caused to function as a reflector having a high efficiency. Since a part of the incident light reflected by each interface in the optical device is transmitted again into the front part of the optical path, and furthermore, the light transmitted from the optical device is not substantially generated, a light utilization efficiency can be enhanced. Consequently, it is possible to increase an application range to an optical device and an optical system which utilize the total reflection of the optical device. A gas contact interface on which the optical device 100 comes in contact with air (which may be an inactive gas) is set to be a total reflecting surface so that the total reflection can be generated with a simple structure without separately providing a layer having such a refractive index as to generate the total reflection.

In the embodiment, moreover, the optical element for changing an optical path is provided in optical contact with the optical element for selecting an optical path. Therefore, both light coupling properties can be enhanced. In addition, in the case in which the optical element for changing an optical path has a directivity, the incident light can be introduced from the optical element for changing an optical path into the optical element for selecting an optical path with the incidence angle component held.

Next, description will be given to another example of a structure in which a Bragg reflecting filter is used as the optical element 12 for selecting an optical path in place of the light interference filter.

Figure 10:
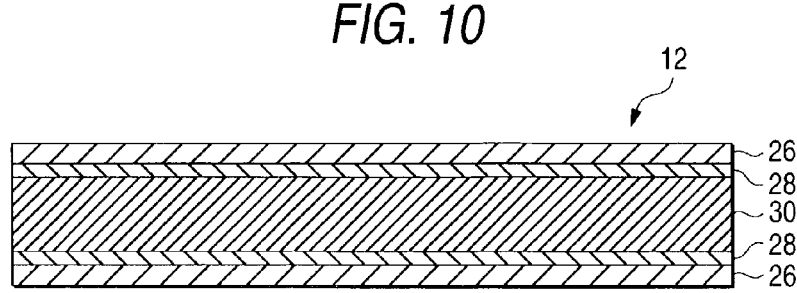
FIG. 10 is a view showing an example in which the optical element for selecting an optical path is constituted by a liquid crystal film.

FIG. 10 shows an example in which the optical element 12 for selecting an optical path is constituted by a liquid crystal film. In this case, the optical element 12 is constituted by a pair of transparent electrodes 26 comprising ITO, an oriented layer 28 formed on the inside thereof, and a cholesteric liquid crystal layer 30 surrounded by the oriented layer 28.

The filtering effect of the cholesteric liquid crystal layer 30 having such a structure will be described below. The cholesteric liquid crystal layer 30 has a cholesteric liquid crystal molecule oriented in parallel with a layer, and presents a spiral structure in the vertical direction to the layer.

A double refractive index $\Delta n$ can be expressed in an equation (2), wherein an ordinary index, an extraordinary index, a double refractive index and a mean refractive index in the cholesteric liquid crystal layer 30 are represented by no, ne, $\Delta n$ and n, respectively.

$$\Delta n = ne - no \qquad (2)$$

Moreover, the mean refractive index n is approximately expressed in an equation (3).

$$n = (ne + no)/2 \qquad (3)$$

Furthermore, in the case in which the spiral pitch of the cholesteric liquid crystal layer 30 is represented by P [nm], the cholesteric liquid crystal layer 30 indicates such a characteristic as to selectively carry out a reflection in the principle of a Bragg reflection. More specifically, in the case in which a light incident on the cholesteric liquid crystal layer 30 at an incidence angle $\theta$ [deg] is selectively reflected, a central wavelength $\lambda(\theta)$ [nm] of the incident light can be expressed in an equation (4).

$$\lambda(\theta) = \lambda(0) \cdot \cos[\sin^{-1}(\sin\theta/n)] \qquad (4)$$

The incident light is incident from air (a refractive index=1). The $\lambda(0)$ [nm] represents a central wavelength with an incidence angle $\theta_0$, that is, when the light is incident vertically to a layer, and can be expressed in an equation (5).

$$\lambda(0) = n \cdot P \qquad (5)$$

Moreover, a reflection wavelength width $\Delta\lambda$ [nm] can be expressed in an equation (6).

$$\Delta\lambda = \Delta n \cdot P \qquad (6)$$

Accordingly, the ordinary index no, the extraordinary index ne and the spiral pitch P which are the physical property values of the cholesteric liquid crystal layer 30 are controlled to form a layer. Consequently, it is possible to form an optical filter having an optional reflecting central wavelength $\lambda(\theta)$ to be changed depending on the incidence angle $\theta$ and a desirable reflecting wavelength width $\Delta\lambda$. For example, the spiral pitch P can be regulated by a manufacturing method for mixing and preparing at least two kinds of materials having different spiral pitches.

In the case in which the wavelength area of an incident light to be an object is large, furthermore, it is also necessary to enlarge the selecting reflection wavelength area of the cholesteric liquid crystal layer. In this case, it is possible to enlarge the reflecting wavelength area by orienting a liquid crystal in such a manner that the spiral pitch is continuously varied in the direction of a thickness. Moreover, it is also possible to enlarge the reflecting wavelength area by laminating the cholesteric liquid crystal layers in the different selecting reflection wavelength areas.

The cholesteric liquid crystal layer 30 can be manufactured in the following manner.

A polyimide oriented film is coated on a support member for forming a cholesteric liquid crystal and is then dried, and a surface treatment is carried out by rubbing. Consequently, the polyimide oriented film is formed. The polyimide oriented film is coated with a prepared solution having a mixture of a low molecular cholesteric liquid crystal or a nematic liquid crystal and a chiral agent causing a twist, a polymeric monomer and a photopolymerization initiator which are mixed with an organic solvent, and orientation is then carried out at a proper temperature. Thereafter, an ultraviolet radiation is exposed to a necessary portion and is photopolymerized, and an unnecessary portion is removed by a development. Finally, high temperature baking is carried out to obtain a stabilization.

In order to control the direction of the twist and the reflecting incidence angle, it is preferable that the cholesteric liquid crystal, the chiral agent and each concentration should be changed appropriately.

Moreover, it is also possible to form a film by using a polymeric cholesteric liquid crystal. In this case, in the same manner as described above, the polyimide oriented film is coated with a prepared solution in which a polymeric cholesteric liquid crystal and a photopolymerization initiator are mixed with an organic solvent and an orientation is then carried out at a proper temperature, and an ultraviolet radiation is exposed to a necessary portion and is photopolymerized. A reflecting incidence angle can be controlled by properly selecting an orientation temperature and a stabilization can be obtained by the photopolymerization.

Figure 11:
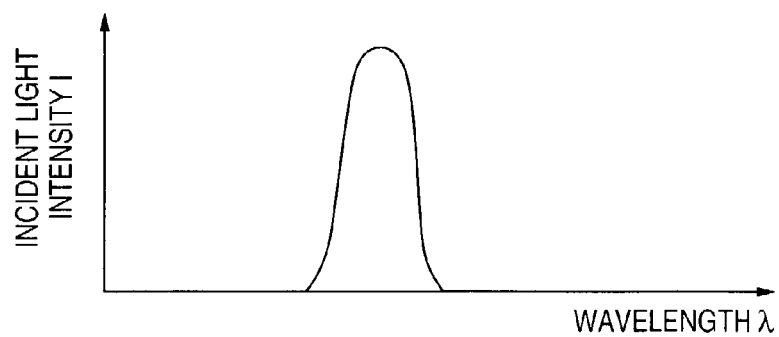
FIGS. 11(a) to 11(f) show the graphs showing, for each incidence angle, a spectral transmittance obtained by the optical element for selecting an optical path in FIG. 10 with respect to the wavelength of the incident light.
Figure 11:
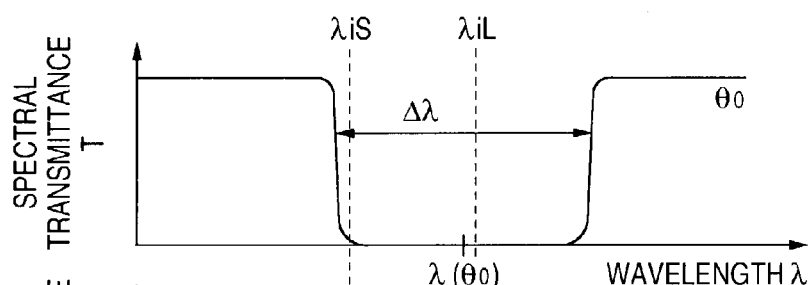
Figure 11:
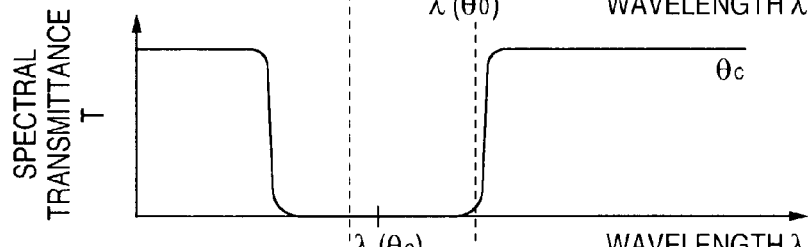
Figure 11:
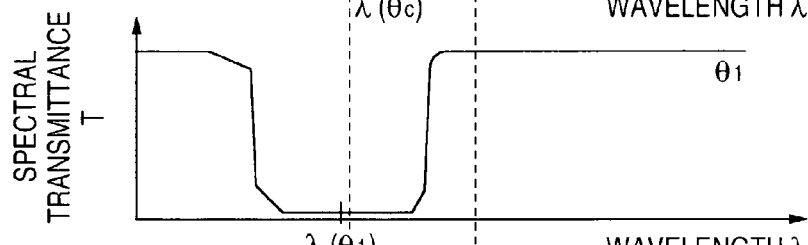
Figure 11:
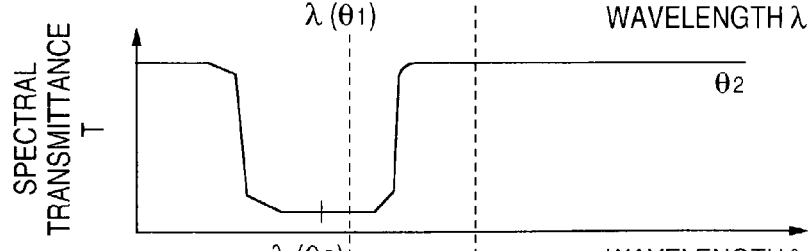
Figure 11:
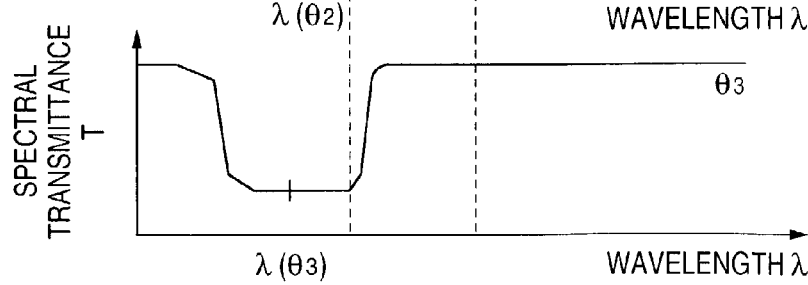

FIG. 11 shows the spectral transmittance of the optical element 12 for selecting an optical path having the structure described above. In this example, a cholesteric liquid crystal layer is obtained by superposing a left twisted cholesteric liquid crystal layer and a right twisted liquid crystal layer and a total polarizing component is reflected in a reflection wavelength area. In the case in which the incidence angle is represented by $\theta_0$ which is equal to or smaller than the total reflecting critical angle $\theta_c$ (see FIG. 7), the spectral transmittance is approximately 0% with respect to the wavelength areas $\lambda_{iS}$ to $\lambda_{iL}$ of the incident light so that a light shielding state is brought. When the incidence angle is greater than the total reflecting critical angle $\theta_c$ and is increased in order of $\theta_1$, $\theta_2$ and $\theta_3$, the transmitting characteristic of the spectral transmittance is shifted toward the short-wavelength side so that the amount of a transmitted light is increased. Consequently, an incident light having an incidence angle component $\theta_0$ is not transmitted but lights having incidence angle components $\theta_1$, $\theta_2$ and $\theta_3$ which are greater than a specific angle are transmitted with an increase in an amount in this order. By carrying out a design to have the spectral characteristic of the optical element 12 such that only a greater incident light component than the total reflecting critical angle $\theta_c$ on a predetermined interface is transmitted, an incident light component which does not satisfy total reflecting conditions can be removed selectively and only an incident light component to be totally reflected can be emitted from the optical element 12.

According to the structure, it is possible to obtain the same functions and effects as those in the case in which the light interference filter is used, and the optical element 12 for selecting an optical path can be implemented at a low cost.

Referring to the cholesteric liquid crystal layer 30, moreover, in the case in which the spiral structure has a right twist, a light having a right circular polarizing component is reflected and a light having a left circular polarizing component along a spiral is transmitted. On the other hand, in the case in which the spiral structure has a left twist, the light having the left circular polarizing component is reflected and the light having the right circular polarizing component is transmitted. In the case in which a light having a total polarizing component is reflected, that is, is not transmitted, accordingly, a total polarized light can be reflected by such a structure that a left twisted (or right twisted) cholesteric layer and the right twisted (or left twisted) cholesteric layer which is reverse thereto are sequentially superposed.

In addition to the cholesteric liquid crystal, a volume hologram is effective for the optical element having the function of the Bragg reflection. The volume hologram has the Bragg reflecting function by a grating-shaped refractive index distribution formed in a film, and serves to reflect a specific wavelength. Moreover, when an incidence angle is increased, the wavelength to be reflected is shifted toward the short-wavelength side and the volume hologram functions as an optical path selecting film. The volume hologram can be formed by using, as a photosensitive material, a photographic sensitive material for a hologram, a phase separation type photopolymer, an HPDLC (a holographic polymer dispersing liquid crystal) or a photolithography material and carrying out multiple beam interference exposure thereto.

Figure 12:
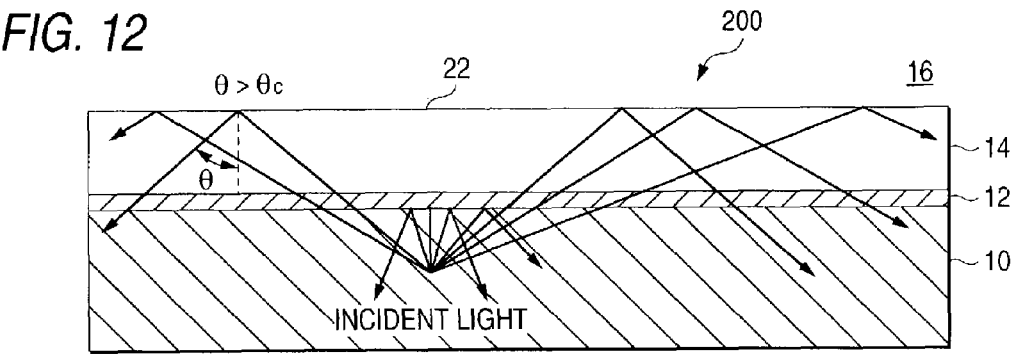
FIG. 12 is a view showing the structure of an optical device according to a variant of the first embodiment.

Next, description will be given to a variant of the optical device 100 according to the embodiment. FIG. 12 is a view showing the structure of an optical device 200 according to the variant of the embodiment, in which an incident light is present in the optical device 200. In other words, a light source is provided in the optical device 200 in the structure. More specifically, there are a structure in which a light source is sealed with a resin in the optical device 200 and a structure in which an optical element 10 itself for changing an optical path is a light emitting element. In this case, an incidence angle may be a predetermined angle or an optional angle.

According to the variant, an incident light is diffused by the optical element 10 for changing an optical path and is then irradiated on the optical element 12 for selecting an optical path in various incidence directions. Thereafter, the optical element 12 for selecting an optical path selectively transmits only an incident light having an angle component to be totally reflected by an interface 22 and reflects incident lights having other angle components. Consequently, it is possible to obtain the same functions and effects as described above.

In the structures of the optical device 100 according to the first embodiment and the optical device 200 according to the variant, a transparent medium 14 may be provided in the rear part of the optical path of the optical element 10 for changing an optical path. In this case, an interface generating a total reflection is set to be an interface in the front part of the optical path of the optical element 12 for selecting an optical path. Thus, it is preferable that the optical device should have the optical element 10 for changing an optical path and the optical element 12 for selecting an optical path provided in this order from the rear part of the optical path toward the front part thereof, and an optional medium such as a transparent medium may be provided between the laminated layers.

Next, description will be given to a second embodiment of the optical device according to the invention.

Figure 13:
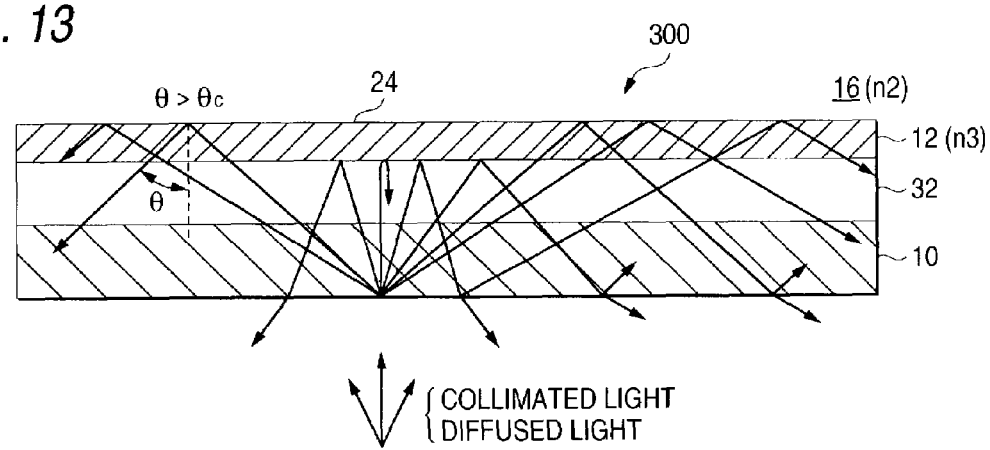
FIG. 13 is a view showing the structure of an optical device according to a second embodiment.

FIG. 13 shows the structure of an optical device 300 according to the embodiment. The optical device 300 according to the embodiment has a multilayer structure in which an optical element 10 for changing an optical path, an intermediate transparent medium 32 having a refractive index of a glass substrate which is greater than 1, and an optical element 12 for selecting an optical path are provided in this order from the introduction side of an incident light. A transparent medium 16 is present in the front part of the optical path of the optical element 12 for selecting an optical path in the optical device 300, and the relationship between a refractive index n3 of the optical element 12 and a refractive index n2 of the transparent medium 16 is set to satisfy total reflecting conditions on the interface of the optical element 12 and the transparent medium 16. Moreover, the incident light may be present on the outside or inside of the optical device 300, and may be a collimated light or a diffused light.

According to the optical device 300, the incident light is diffused by the optical element 10 for changing an optical path and is then irradiated on the optical element 12 for selecting an optical path through the intermediate transparent medium 32 in various incidence directions. The refractive index of each medium is properly regulated or a reflection preventing treatment is carried out on each interface such that a total reflection is not substantially generated on an interface with the intermediate transparent medium 32. Thereafter, only a light having an incidence angle component to be totally reflected in the optical element 12 for selecting an optical path in the incident light is transmitted through the optical element 12 and the transmitted light is totally reflected by an interface 24 of the optical element 12 for selecting an optical path and the transparent medium 16, while an incident light component which does not satisfy the total reflecting conditions is reflected in the front part of the optical path of the optical element 12 for selecting an optical path. Consequently, it is possible to obtain the same functions and effects as described above.

Next, description will be given to a third embodiment of the optical device according to the invention.

Figure 14:
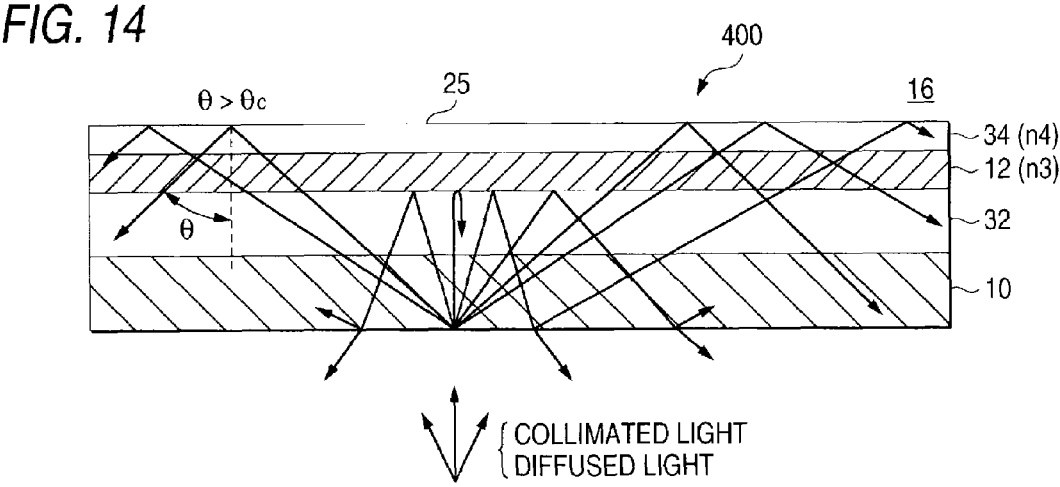
FIG. 14 is a view showing the structure of an optical device according to a third embodiment.

FIG. 14 shows the structure of an optical device 400 according to the embodiment. The optical device 400 according to the embodiment has a multilayer structure in which an optical element 10 for changing an optical path, an intermediate transparent medium 32 having a refractive index of a glass substrate which is greater than 1, an optical element 12 for selecting an optical path which has a mean refractive index of n3 and a transparent medium 34 having a refractive index of n4 are provided in this order from the introduction side of an incident light, and the transparent medium 34 such as a transparent thin film is provided in the front part of the optical path of the incident light in the optical device 300 according to the second embodiment. The transparent medium 16 is present in the front part of the optical path of the transparent medium 34 in the optical device 400, and the relationship between the refractive index n4 of the transparent medium 34 and a refractive index n2 of the transparent medium 16 is set to satisfy total reflecting conditions on the interface of the transparent medium 34 and the transparent medium 16. Moreover, the incident light may be present on the outside or inside of the optical device 400 and may be a collimated light or a diffused light.

According to the optical device 400 in accordance with the embodiment, the incident light is diffused by the optical element 10 for changing an optical path and is then irradiated on the optical element 12 for selecting an optical path through the intermediate transparent medium 32 in various incidence directions. Thereafter, only a light having an incidence angle component to be totally reflected by an interface 25 of the transparent medium 34 and the transparent medium 16 is transmitted by the optical element 12 for selecting an optical path and the transmitted light is totally reflected by the interface 25 of the transparent medium 34 and the transparent medium 16, while an incident light component which does not satisfy the total reflecting conditions is reflected in the front part of the optical path of the optical element 12 for selecting an optical path. Consequently, it is possible to produce the same functions and effects as described above.

By regulating the refractive index of the transparent medium 34, it is possible to set an interface generating the total reflection into the front part of the optical path of the transparent medium 34 or into the interface of the optical element 12 for selecting an optical path and the transparent medium 34.

Figure 15:
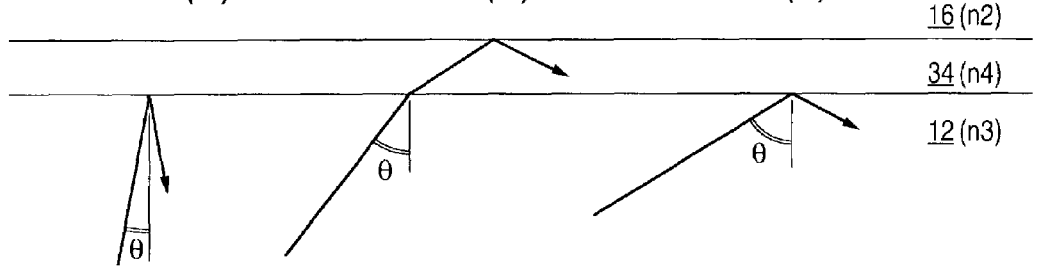
FIG. 15 is a view showing a difference in an optical path for an incidence angle in the case in which a refractive index of a transparent medium is smaller than a refractive index n3 of the optical element for selecting an optical path.

The reflecting conditions of the transparent medium 34 will be described below. FIG. 15 is a view showing a difference in an optical path for an incidence angle θ in the case in which the refractive index n4 of the transparent medium 34 is smaller than the refractive index n3 of the optical element 12 for selecting an optical path, and the incidence angle θ is gradually increased in order of (a) to (c). The light is reflected by the interface of the optical element 12 for selecting an optical path and the transparent medium 34 in the (a) in which the incidence angle θ is small, the light is transmitted through the interface and is totally reflected in the front part of the optical path of the transparent medium 34 in the (b), and the light is totally reflected by the interface in the (c) in which the incidence angle θ is great. At this time, an incidence angle condition in each state is as follows.

In the case of (a): $\theta \leq \sin^{-1}(1/n3)$

In the case of (b): $\sin^{-1}(1/n3) < \theta < \sin^{-1}(n4/n3)$

In the case of (c): $\sin^{-1}(n4/n3) \leq \theta$

Figure 16:
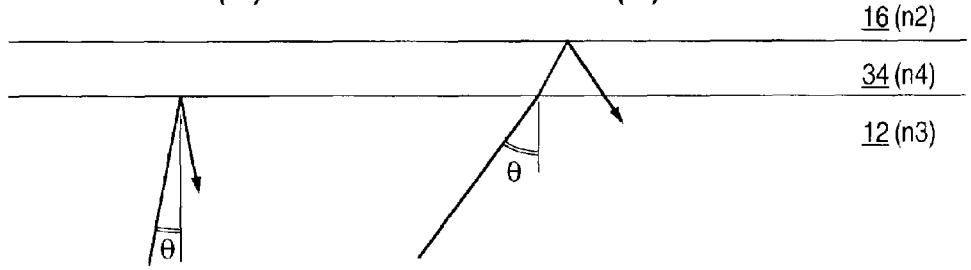
FIG. 16 is a view showing the difference in an optical path for the incidence angle in the case in which the refractive index of the transparent medium is equal to or greater than that of the optical element for selecting an optical path.

Moreover, FIG. 16 shows a difference in the optical path for the incidence angle θ in the case in which the refractive index n4 of the transparent medium 34 is equal to or greater than the refractive index n3 of the optical element 12 for selecting an optical path. In this case, the light is not totally reflected by the interface of the optical element 12 for selecting an optical path and the transparent medium 34. Similarly, the incidence angle condition in each state is as follows.

In the case of (a): $\theta \leq \sin^{-1}(1/n3)$

In the case of (b) $\sin^{-1}(1/n3) < \theta$

By appropriately regulating the refractive index of the transparent medium 34 depending on the situation of use of the optical device, accordingly, it is possible to set the interface generating the total reflection into the front part of the optical path of the transparent medium 34 or the interface of the optical element 12 for selecting an optical path and the transparent medium 34 and it is possible to optionally set the interface generating the total reflection.

The transparent medium 34 according to the embodiment may be provided as a protective film for preventing the external damage or deterioration of the optical element 12 for selecting an optical path or may be a film having other functions, for example, a film having optical or electrical functions. Moreover, the transparent medium 34 may be constituted by a plurality of films.

The multipurpose transparent medium 34 may be provided in the front part of the optical path of the transparent medium 16 in the optical device 100 according to the first embodiment shown in FIG. 1. Also in this case, it is possible to obtain the same effects as described above.

Next, description will be given to a fourth embodiment of the optical device according to the invention.

Figure 17:
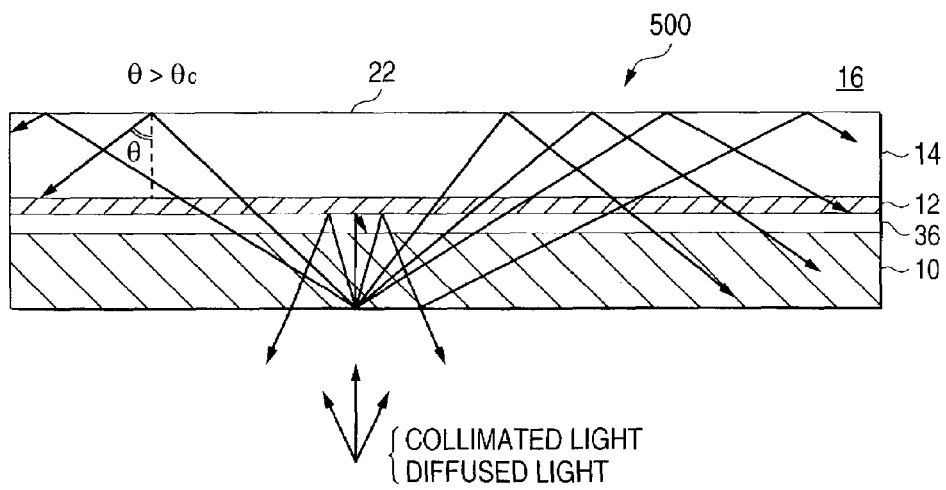
FIG. 17 is a view showing the structure of an optical device according to a fourth embodiment.

FIG. 17 shows the structure of an optical device 500 according to the embodiment. The optical device 500 according to the embodiment has a multilayer structure in which an optical element 10 for changing an optical path, an optical connecting medium 36 such as an adhesive layer, an optical element 12 for selecting an optical path and a transparent medium 14 such as a glass substrate are provided in this order from the introduction side of an incident light, and the optical connecting medium 36 is provided between the optical element 10 for changing an optical path and the optical element 12 for selecting an optical path in the optical device 100 according to the first embodiment. A transparent medium 16 is present in the front part of the optical path of the transparent medium 14 in the optical device 500, and the relationship between a refractive index n4 of the transparent medium 14 and a refractive index n2 of the transparent medium 16 is set to satisfy total reflecting conditions on an interface 22 of the transparent medium 14 and the transparent medium 16. Moreover, an incident light may be present on the outside or inside of the optical device 500 and may be a collimated light or a diffused light.

According to the optical device 500 in accordance with the embodiment, the incident light is diffused by the optical element 10 for changing an optical path and is then introduced through the optical connecting medium 36 into the optical element 12 for selecting an optical path in various incidence directions. Thereafter, only a light having an incidence angle component to be totally reflected by the interface of the transparent medium 14 and the transparent medium 16 in the front part of the optical path is transmitted by the optical element 12 for selecting an optical path and the transmitted light is totally reflected by the interface 22 of the transparent medium 14 and the transparent medium 16, while an incident light component which does not satisfy the total reflecting conditions is reflected in the front part of the optical path of the optical element 12 for selecting an optical path. Consequently, it is possible to obtain the same functions and effects as described above.

The multipurpose transparent medium 34 according to the third embodiment may be provided in the front part of the optical path of the transparent medium 14 according to the embodiment. Also in this case, it is possible to obtain the same effects as described above. By regulating the refractive indices of the transparent medium 34 and the transparent medium 14, it is possible to set a total reflecting surface into the front part of the optical path of the transparent medium 34 or the interface of the transparent medium 14 and the transparent medium 34.

Next, description will be given to a fifth embodiment of the optical device according to the invention.

Figure 18:
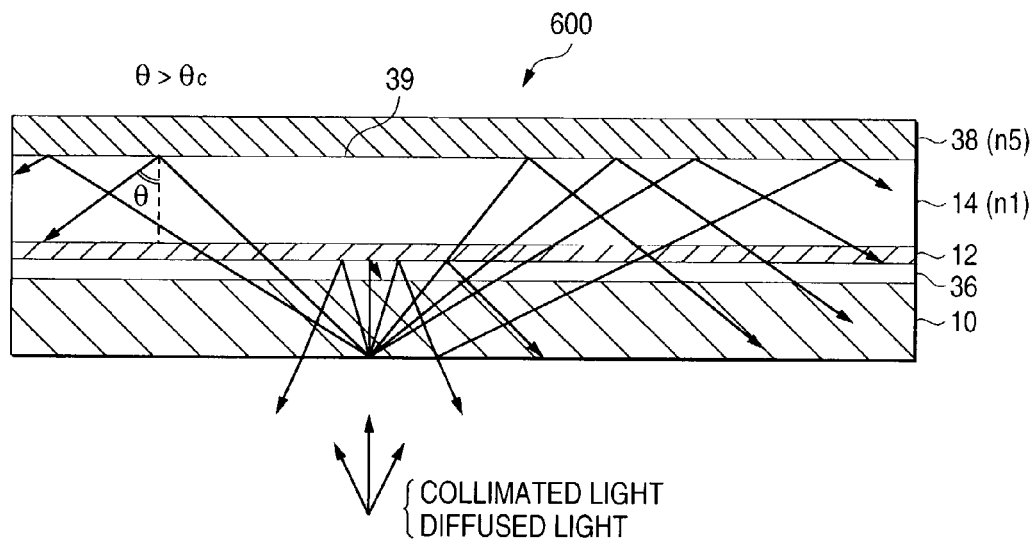
FIG. 18 is a view showing the structure of an optical device according to a fifth embodiment.

FIG. 18 shows the structure of an optical device 600 according to the embodiment. The optical device 600 according to the embodiment has a multilayer structure in which an optical element 10 for changing an optical path, an optical connecting medium 36 such as an adhesive layer, an optical element 12 for selecting an optical path, a transparent medium 14 such as a glass substrate and a medium 38 having a smaller refractive index n5 than a refractive index n1 of the transparent medium 14 are provided in this order from the introduction side of an incident light, and the medium 38 having a lower refractive index is provided in the front part of an optical path for an incident light in the optical device 500 according to the fourth embodiment. The relationship between a refractive index n1 of the transparent medium 14 and a refractive index n5 of the medium 38 in the optical device 600 is set to satisfy total reflecting conditions on an interface 39 of the transparent medium 14 and the medium 38. Moreover, an incident light may be present on the outside or inside of the optical device 500 and may be a collimated light or a diffused light.

According to the optical device 600 in accordance with the embodiment, the incident light is diffused by the optical element 10 for changing an optical path and is then introduced through the optical connecting medium 36 into the optical element 12 for selecting an optical path in various incidence directions. Thereafter, only a light having an incidence angle component to be totally reflected by an interface 39 of the transparent medium 14 and the medium 38 in the front part of the optical path is transmitted by the optical element 12 for selecting an optical path and the transmitted light is totally reflected by the interface 39 of the transparent medium 14 and the medium 38. On the other hand, an incident light component which does not satisfy the total reflecting conditions is reflected in the front part of the optical path of the optical element 12 for selecting an optical path. Consequently, it is possible to obtain the same functions and effects as described above.

The medium 38 according to the embodiment may be provided as a protective film for preventing the external damage or deterioration of the optical element 12 for selecting an optical path.

Next, description will be given to a sixth embodiment of the optical device according to the invention.

Figure 19:
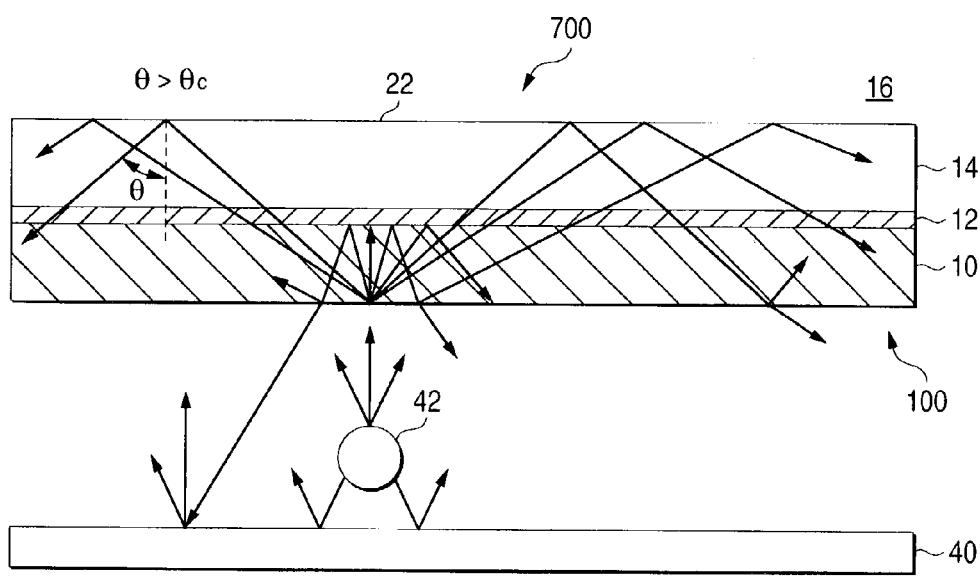
FIG. 19 is a view showing the structure of an optical device according to a sixth embodiment.

FIG. 19 shows the structure of an optical device 700 according to the embodiment. The optical device 700 according to the embodiment is provided with a reflector 40 such as a diffusion reflector or a specular mirror which is opposed to the incident light introduction side of the optical device 100 according to the first embodiment to reflect a light, and a light source 42 is provided between the reflector 40 and the optical device 100. Accordingly, a light transmitted from the light source 42 is irradiated from the outside of the optical device 100. The light may be a collimated light or a diffused light.

According to the optical device 700 in accordance with the embodiment, the incident light transmitted from the light source 42 is irradiated on an optical element 10 for changing an optical path and is diffused, and is then introduced into an optical element 12 for selecting an optical path in various incidence directions. Only a light having an incidence angle component to be totally reflected by an interface 22 of a transparent medium 14 and a transparent medium 16 in the front part of an optical path is transmitted through the optical element 12 for selecting an optical path, and is totally reflected by the interface 22 of the transparent medium 14 and the transparent medium 16. On the other hand, an incident light component which does not satisfy total reflecting conditions is reflected by the optical element 12 for selecting an optical path. The reflected light is transmitted again into the optical element 12 side for changing an optical path by means of the reflector 40 and is thus recycled. In the case in which the light source 42 emits a diffused light, moreover, a light emitted to the opposite side to the optical element 12 side for changing an optical path is reflected by the reflector 40 and is thus recycled. Consequently, the light utilization efficiency of each of the light source 42 and the optical device 700 can be enhanced and the light output intensity of the optical device 700 can be increased.

In addition to the foregoing, there are various combinations of the optical element for changing an optical path, the optical element for selecting an optical path and the transparent medium, and furthermore, a total reflecting interface can also be proposed variously. It is also possible to employ any combination which does not depart from the scope of the invention.

Next, description will be given to a seventh embodiment according to the invention in which an optical device is constituted by using only the element for selecting an optical path in the optical element for changing an optical path and the optical element for selecting an optical path.

Figure 20:
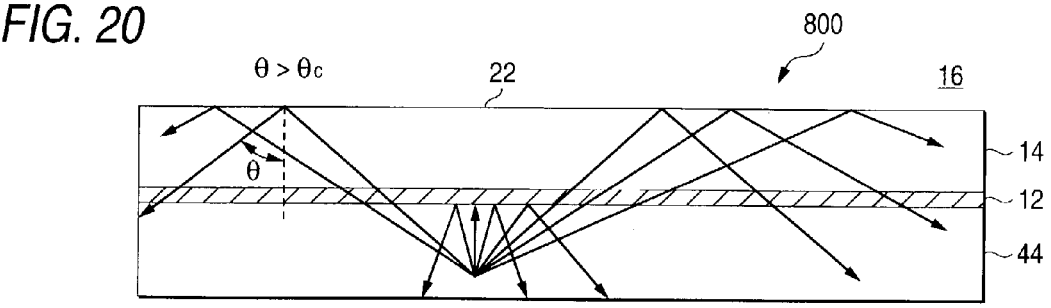
FIG. 20 is a view showing the structure of an optical device according to a seventh embodiment.

FIG. 20 shows the structure of an optical device 800 according to the embodiment. The optical device 800 according to the embodiment has a multilayer structure in which a transparent base material 44 such as a glass substrate or a transparent resin, an optical element 12 for selecting an optical path and a transparent medium 14 having a total reflecting surface are provided in this order from the introduction side of an incident light. A transparent medium 16 is present in the front part of the optical path of the transparent medium 14 in the optical device 800, and the relationship between a refractive index n4 of the transparent medium 14 and a refractive index n2 of the transparent medium 16 is set to satisfy total reflecting conditions on the interface of a transparent medium 34 and the transparent medium 16. Moreover, an incident light in this case has already been introduced into the transparent base material 44 and is thus present. The presence can be implemented by a structure in which a light is introduced from another optical path into the transparent base material 44 or a structure in which a light emitting source is present in the transparent base material 44.

According to the optical device 800 in accordance with the embodiment, the incident light introduced into the transparent base material 44 is irradiated on the optical element 12 for selecting an optical path in various directions. Then, only a light having an incidence angle component to be totally reflected by an interface 22 of the transparent medium 14 and the transparent medium 16 is transmitted by the optical element 12 for selecting an optical path and the transmitted light is totally reflected by the interface 22 of the transparent medium 14 and the transparent medium 16. On the other hand, an incident light component which does not satisfy the total reflecting conditions is reflected in the front part of the optical path of the optical element 12 for selecting an optical path. Consequently, it is possible to obtain the same functions and effects as described above.

It is also possible to employ such a structure that a medium having a lower refractive index than a refractive index n1 of the transparent medium 14 is provided in the front part of an optical path for the incident light of the transparent medium 14. Also in this case, the incident light introduced into the optical element 12 for selecting an outward route is reflected by a total reflection through the interface 22 in the front part of the optical path of the transparent medium 14.

Next, description will be given to a variant of the optical device 800 according to the embodiment.

Figure 21:
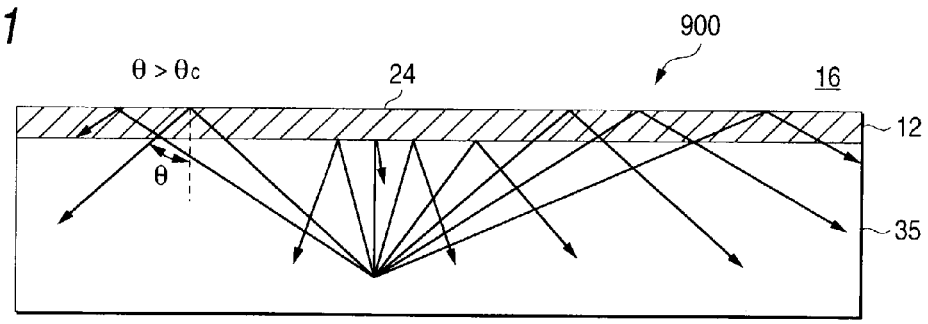
FIG. 21 is a view showing the structure of an optical device according to a variant of the seventh embodiment.

FIG. 21 shows the structure of an optical device 900 according to the variant. The optical device 900 according to the variant has a structure in which an optical element 12 for selecting an optical path is provided on a transparent medium 35 such as a glass substrate or a transparent resin.

A transparent medium 16 is present in the front part of the optical path of the optical element 12 for selecting an optical path in the optical device 900, and the relationship between a refractive index n3 of the optical element 12 and a refractive index n2 of the transparent medium 16 is set to satisfy total reflecting conditions on an interface 24 of the optical element 12 and the transparent medium 16.

According to the optical device 900 in accordance with the embodiment, the incident light introduced into the transparent medium 35 is irradiated on the optical element 12 for selecting an optical path in various directions. Then, only a light having an incidence angle component to be totally reflected by the interface 24 is transmitted by the optical element 12 for selecting an optical path and the transmitted light is totally reflected by the interface 24. On the other hand, an incident light component which does not satisfy the total reflecting conditions is reflected in the front part of the optical path of the optical element 12 for selecting an optical path. Consequently, it is possible to obtain the same functions and effects as described above.

Next, description will be given to an embodiment in which an optical element for selecting an optical path which is used in the optical device according to each of the first to seventh embodiments can be implemented with a simple and inexpensive structure without using a dielectric multilayer film and a cholesteric liquid crystal film.

First of all, description will be given to an eighth embodiment of the optical device according to the invention in which the optical device is constituted by a transmission type diffraction grating.

Figure 22:
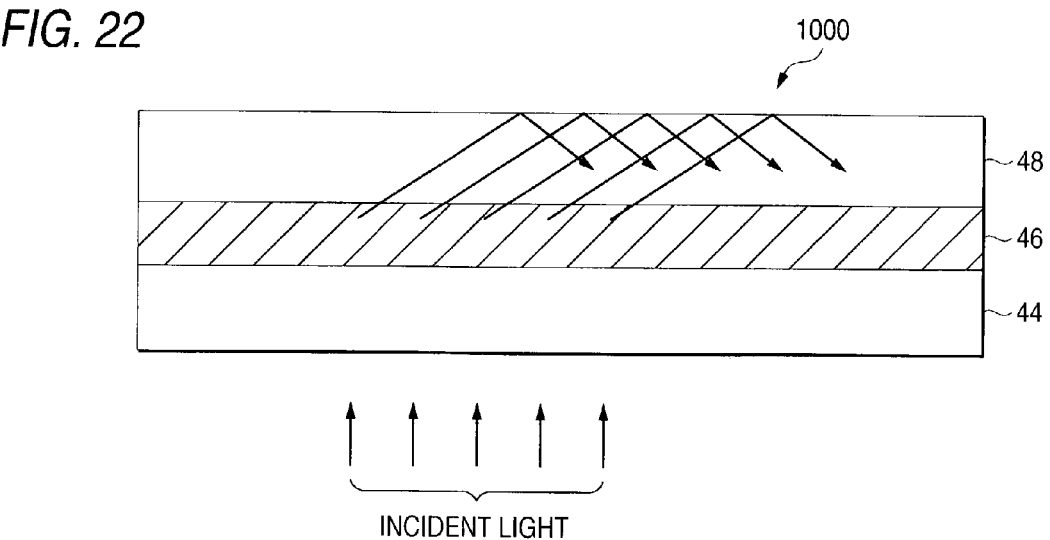
FIG. 22 is a view showing the structure of an optical device according to an eighth embodiment.

FIG. 22 shows the structure of an optical device 1000 according to the embodiment. The optical device 1000 according to the embodiment has a multilayer structure in which a transparent base material 44 such as a glass substrate or a transparent resin, a transmission type diffraction grating 46 and a medium 48 having a total reflecting surface are provided in this order from the introduction side of an incident light. The incident light is a planar light ranging within a specific incidence angle. In the case in which the transmission type diffraction grating 46 is obtained by multiple hologram interference exposure, an optional incidence angle may be set.

While the volume hologram shown in FIG. 2(*a*) can be preferably used for the transmission type diffraction grating 46, it is also possible to use the relief type diffraction grating shown in FIG. 2(*b*), the refractive index distribution type diffraction grating shown in FIG. 2(*c*) or an amplitude modulation type diffraction grating.

According to the optical device 1000 in accordance with the embodiment, when a planar incident light to be a collimated light is irradiated on the optical device 1000, it is transmitted through the transparent base material 44 and an optical path is converted to have such an angle as to generate a total reflection in the medium 48 through the transmission type diffraction grating 46. In other words, the transmission type diffraction grating 46 is designed such that the incident light has an angle at which the total reflection is generated in the medium 48. By the transmission type diffraction grating 46, thus, it is possible to convert the incident light to have such an angle as to generate the total reflection, thereby generating the total reflection over the interface of the medium 48 in the front part of an optical path for the incident light.

Next, description will be given to a ninth embodiment of the optical device according to the invention in which the optical device is constituted by using a prism.

Figure 23:
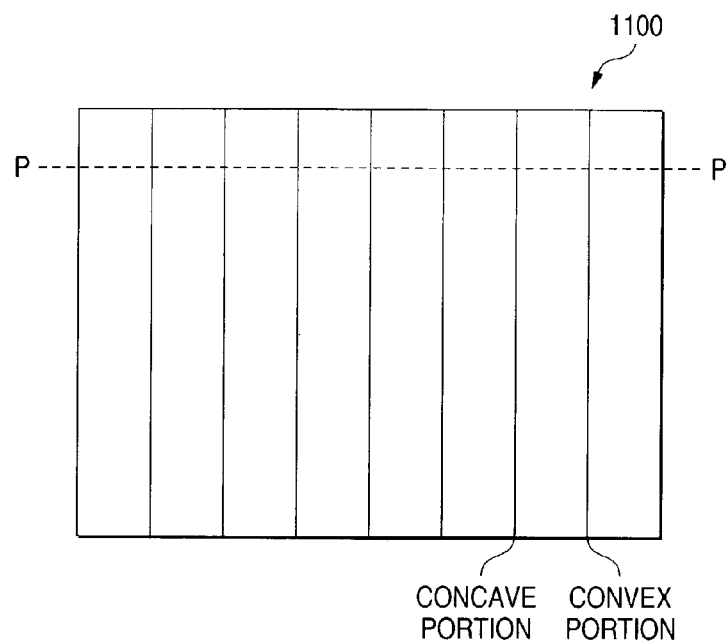
FIGS. 23(a) and 23(b) show the views showing the structure of an optical device according to a ninth embodiment.
Figure 23:
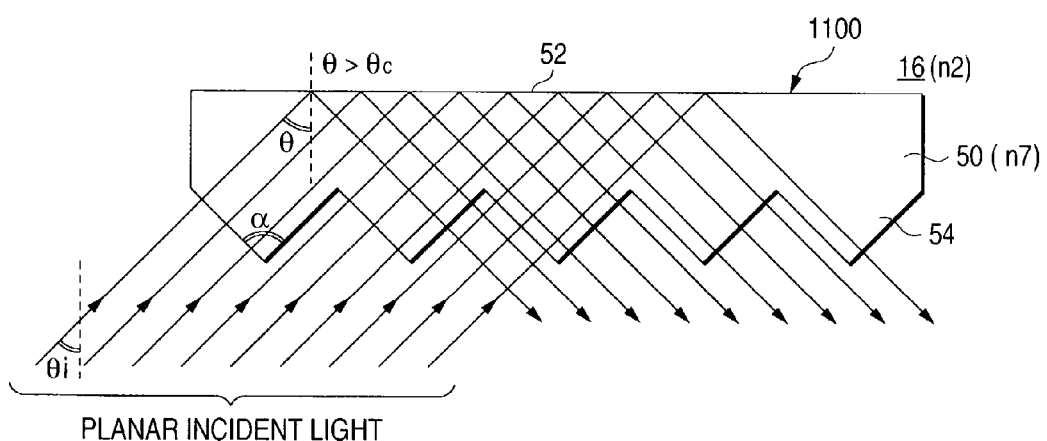

FIG. 23 shows the structure of an optical device 1100 according to the embodiment. The optical device 1100 according to the embodiment comprises a microprism array 50, and FIG. 23(*a*) is a plan view showing the microprism array 50 seen from the incidence surface side of a light and FIG. 23(*b*) is a sectional view showing a P-P section in (a).

The microprism array 50 is plate-shaped and has such a configuration that an upper surface is set to be a flat total reflecting surface 52 and a lower surface is provided with a plurality of concavo-convex prisms 54 having a cone-shaped section in parallel.

Examples of the material of the microprism array 50 include a glass and a resin, and particularly, the resin is preferable in respect of mass production. For the resin, acryl based resins, epoxy based resins, polyester based resins, polycarbonate based resins, styrene based resins and vinyl chloride based resins are optically preferable, and furthermore, examples of the resin material include a photo-curing type, a photo-dissolving type, a thermosetting type and a thermoplastic type which can be selected appropriately.

As a method of manufacturing the microprism array 50, casting using a mold, hot press molding, injection molding, printing or photolithography is preferable in respect of a productivity More specifically, formation can be carried out by pressing a thermoplastic resin in a microprism-shaped mold. Moreover, the formation can be carried out by filling the mold with a photo-curing resin or a thermosetting resin and then curing the resin through a light or heat and removing the cured resin from the mold.

For the photolithography, the formation is carried out by exposing an ultraviolet radiation (or a visible light) to a photo-dissolving resin or a photo-curing resin through a shielding mask patterned properly and performing a dissolving development in the exposed portion or the dissolving development in an unexposed portion. It is possible to obtain a microprism having a desirable shape by a resin material and an exposure amount distribution. Depending on the resin material, moreover, it is possible to carry out a high temperature baking treatment after the development, thereby obtaining the microprism array 50 having a desirable shape by a surface tension during thermosoftening.

Furthermore, the incident light is a planar light ranging within a specific incidence angle and is incident on the optical device 1100 at an incidence angle $\theta_i$ as shown in FIG. 23(*b*).

According to the optical device 1100 in accordance with the embodiment, in the case in which a medium present around the microprism array 50 is air (a refractive index n2=1) and the microprism array 50 is formed of a transparent resin (a refractive index n7=1.5), a total reflecting critical angle $\theta_c$ on a total reflecting surface 52 is calculated in the same manner as in the equation (1) to be 42 [deg].

As an example for setting an incidence angle $\theta$ for the total reflecting surface 52 to be $\theta \geq \theta_c$, therefore, a vertical angle α of the prism is set to be approximately 90 [deg] and a lateral opening angle is set to be approximately 45 [deg]. In this case, when the incident light is incident from the outside of the prism, the incidence angle $\theta_i$ of the incident light is set to be approximately 45 [deg]. Under this condition, an optical shading is not substantially generated but the incident light can be totally reflected efficiently by the total reflecting surface 52. The vertical angle α of the prism is not restricted thereto.

By using the microprism array 50 which can be mass produced easily and inexpensively, consequently, it is possible to introduce an incident light to be irradiated like a plane and to totally reflect the substantially whole incident light thus introduced.

Next, description will be given to a tenth embodiment of the optical device according to the invention in which the optical device is constituted by using the microprism array according to the ninth embodiment.

Figure 24:
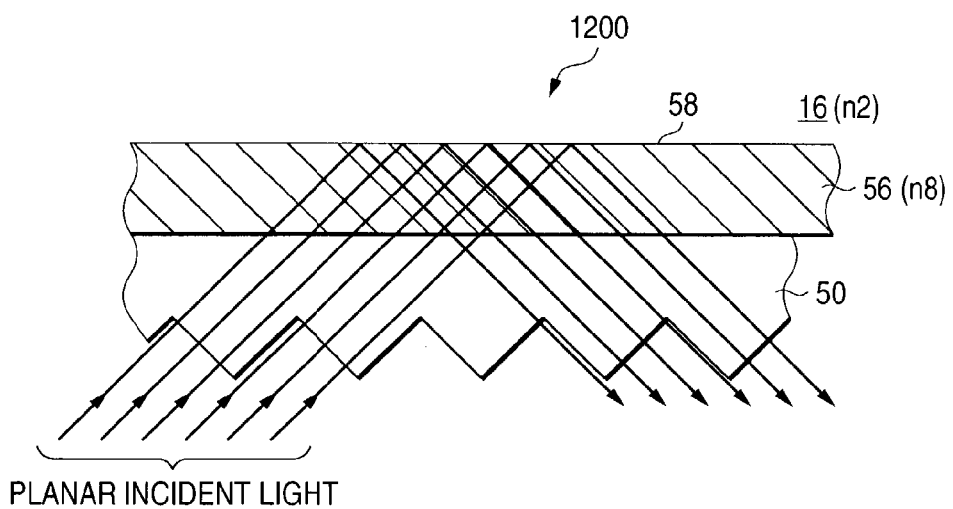
FIG. 24 is a view showing the structure of an optical device according to a tenth embodiment.
Figure 25:
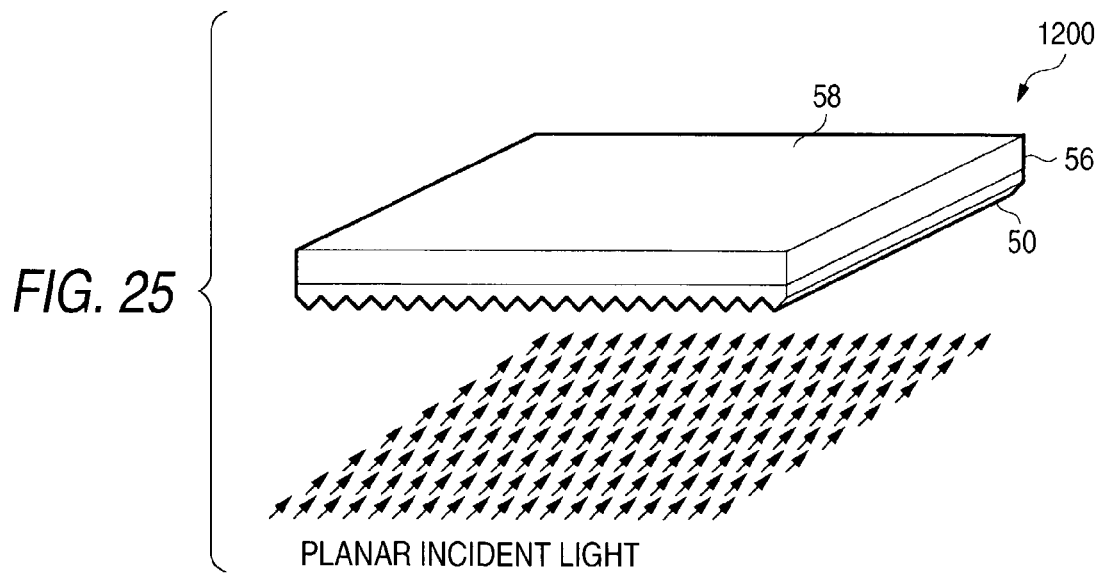
FIG. 25 is a view showing the conceptual whole structure of the optical device in FIG. 24.

FIG. 24 shows the sectional structure of an optical element 1200 according to the embodiment and FIG. 25 shows the conceptional whole structure of the optical element 1200. The optical element 1200 according to the embodiment has a lamination structure in which a microprism array 50 and a transparent medium 56 such a glass or a resin are provided from the introduction side of an incident light.

A transparent medium 16 is present in the front part of the optical path of the transparent medium 56 in the optical element 1200, and the relationship between a refractive index n8 of the transparent medium 56 and a refractive index n2 of the transparent medium 16 is set to satisfy total reflecting conditions on the interface of the transparent medium 56 and the transparent medium 16. Moreover, an incident light is a planar light ranging within a specific incidence angle.

According to the optical element 1200 in accordance with the embodiment, the planar incident light is irradiated on the microprism array 50 and an incident light having a predetermined incidence angle component set by a vertical angle α of a prism by means of the microprism array 50 is introduced into the transparent medium 56. Then, the incident light thus introduced is totally reflected efficiently by a total reflecting surface 58 of the transparent medium 56.

By using the microprism array 50 which can be mass produced easily and inexpensively to introduce an incident light to be irradiated like a plane, thus, it is possible to totally reflect the substantially whole introduced incident light by the interface 58 of the transparent medium 56.

Next, description will be given to an eleventh embodiment of the optical device according to the invention in which an optical element for changing an optical path at an angle corresponding to the light incidence angle of a microprism array 50 is provided in the front part of the optical path of the optical element 1200 according to the tenth embodiment, thereby constituting the optical device.

Figure 26:
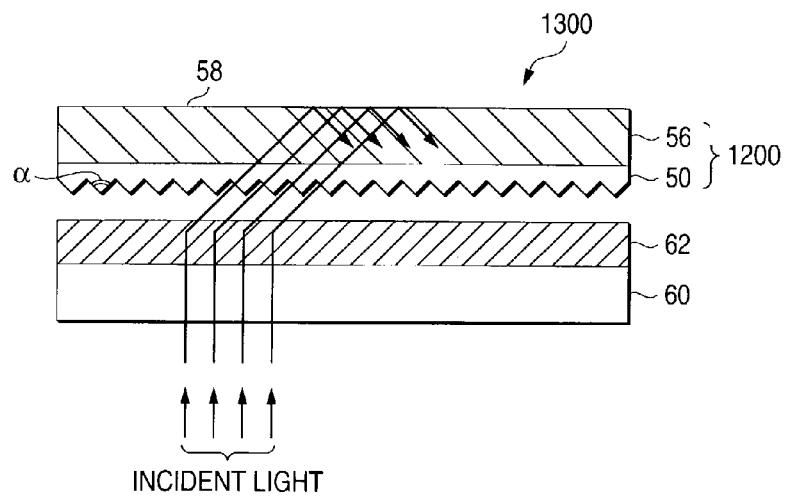
FIG. 26 is a view showing the structure of an optical device according to an eleventh embodiment.

FIG. 26 shows the sectional structure of an optical device 1300 according to the embodiment. The optical device 1300 according to the embodiment comprises an optical element having a transparent base material 60 such as a glass substrate or a transparent resin and a transmission type diffraction grating 62 provided in this order and the optical element 1200 according to the tenth embodiment from the introduction side of an incident light. The incident light is a planar light ranging within a specific incidence angle.

While a volume hologram can be preferably used for the transmission type diffraction grating 62 in the same manner as the transmission type diffraction grating 46 according to the seventh embodiment, it is also possible to use a relief type diffraction grating, a refractive index distribution type diffraction grating or an amplitude modulation type diffraction grating.

According to the optical device 1300 in accordance with the embodiment, when a planar incident light to be a collimated light is irradiated on the optical device 1300, it is transmitted through the transparent base material 60 and an optical path is converted into a light having a predetermined incidence angle component set by a vertical angle α of a microprism array 50 by the transmission type diffraction grating 62. More specifically, the optical path is converted to have such an angle as to generate a total reflection by an interface 58 of a transparent medium 56. In other words, the transmission type diffraction grating 62 is designed such that an incident light has an angle at which a total reflection is generated by the interface 58 of the transparent medium 56. By converting the incident light to have such a predetermined incidence angle as to be introduced into the microprism array 50 by the transmission type diffraction grating 62, thus, it is possible to totally reflect the introduced incident light by the interface 58 of the transparent medium 56.

The optical device according to the invention described above can be applied to a reflector such as a visible transparent film for reflecting an infrared light, a high efficient reflecting film, a high efficient reflecting film having a wavelength selectivity or a reflector or film for a light source having a high efficiency, an indicator such as a decorative illumination advertisement display utilizing a planar total reflected light, an optical modulating element and a plane display, for example.

Description will be given to a specific example of the structure of the optical device according to the invention and a result obtained by calculating, through a simulation, the spectral transmittance of the optical device according to the example of the structure.

Figure 27:
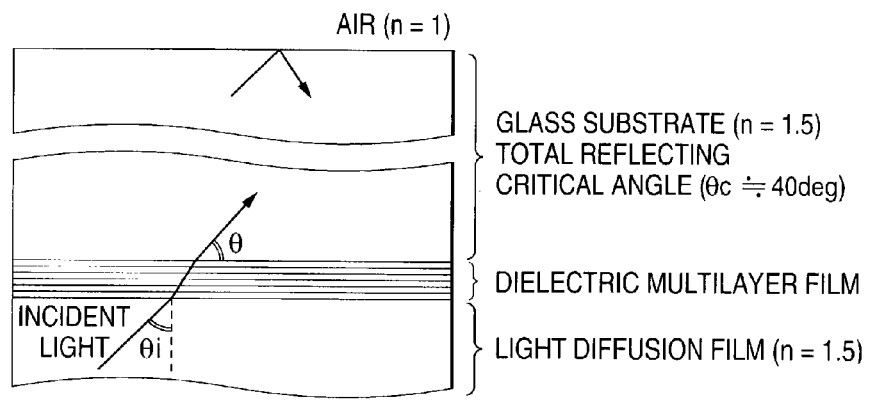
FIG. 27 is a view showing an example of a structure of the optical device according to the invention.

FIG. 27 shows an example of the structure of the optical device according to the invention. In the optical device in this case, a light diffusing film (a refractive index n=1.5) to be an optical element for changing an optical path, a dielectric multilayer film to be an optical element for selecting an optical path and a glass substrate (a refractive index n=1.5) are sequentially provided from the introduction side of an incident light. Air (a refractive index n=1.0) is present in the front part of the optical path of the glass substrate.

Figure 28:
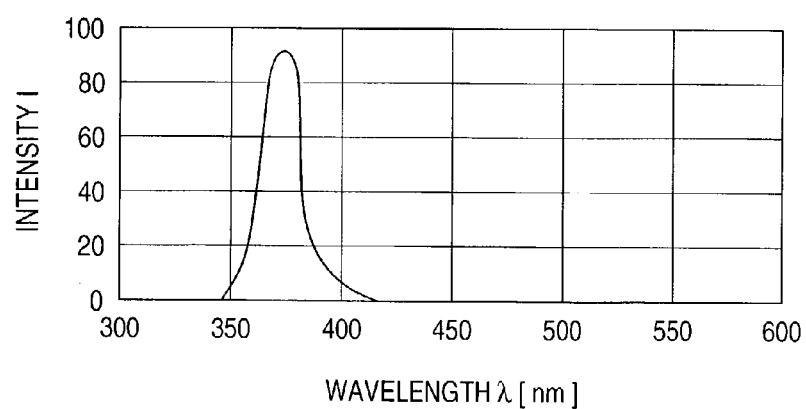
FIG. 28 is a graph showing the wavelength band of an incident light.

The dielectric multilayer film has a 29-layer structure of $TiO_2/SiO_2/ \ldots /SiO_2/TiO_2$ and the optical thickness of each layer is set to be $\frac{1}{4}\lambda$ (a wavelength $\lambda$=440 [nm]). Moreover, a UV light source having a wavelength $\lambda$=350 to 400 [nm] shown in FIG. 28 was used for the incident light. In this case, a total reflecting critical angle $\theta_c$ is set to be approximately 40 [deg].

Figure 29:
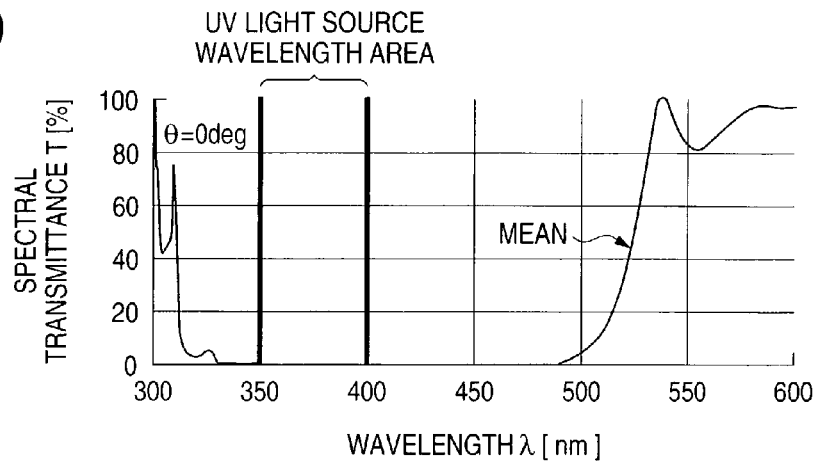
FIGS. 29(a) to 29(c) show the graphs showing a change in a spectral transmittance for a wavelength every incidence angle.
Figure 29:
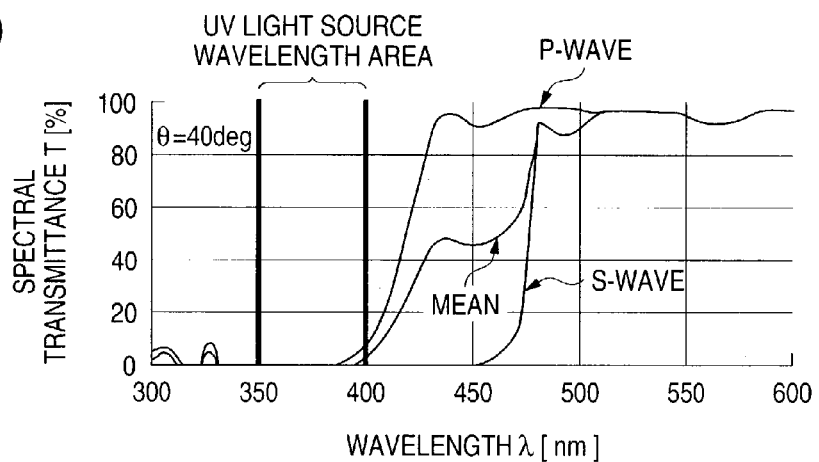
Figure 29:
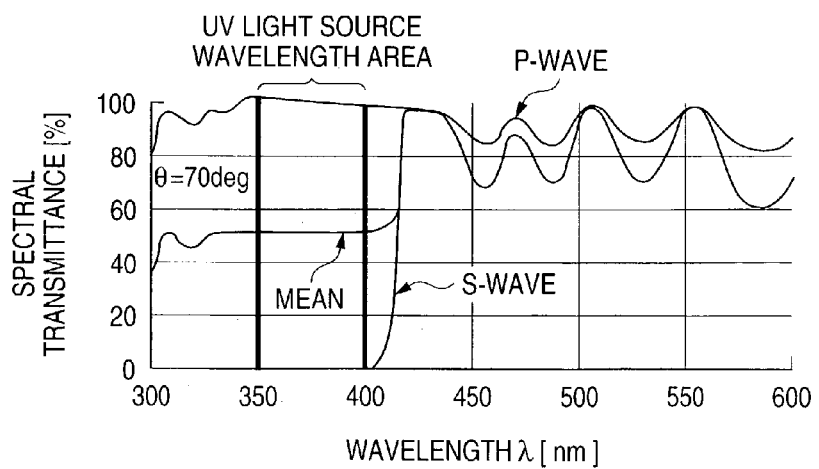
Figure 30:
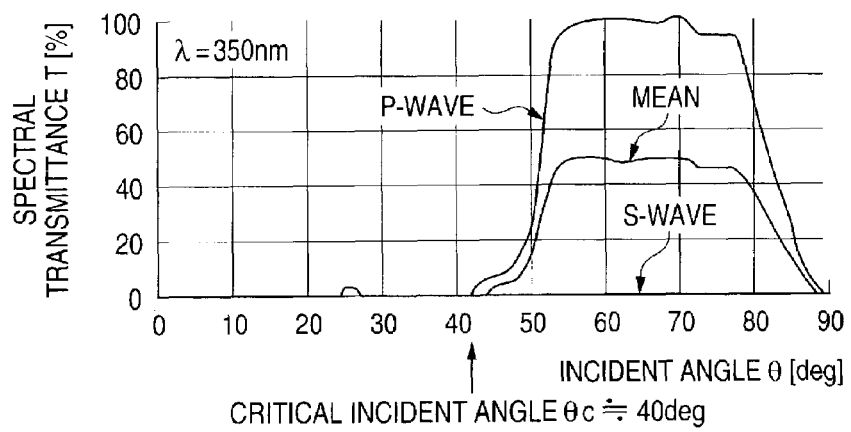
FIGS. 30(a) to 30(c) show the graphs showing the spectral transmittance for the incidence angle every wavelength.
Figure 30:
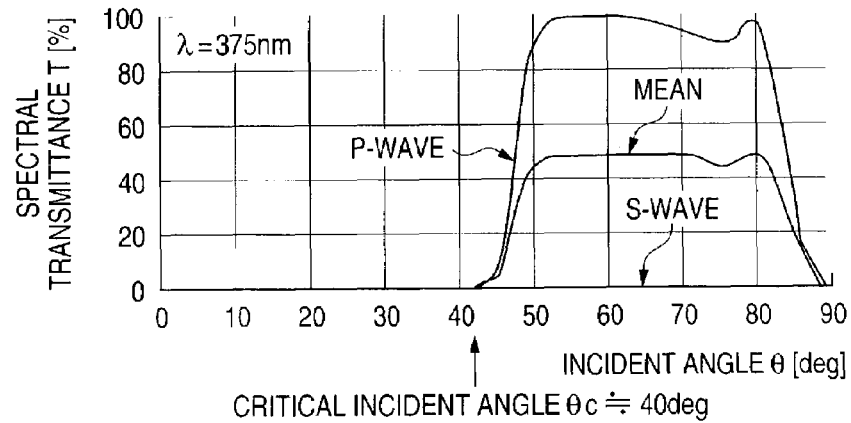
Figure 30:
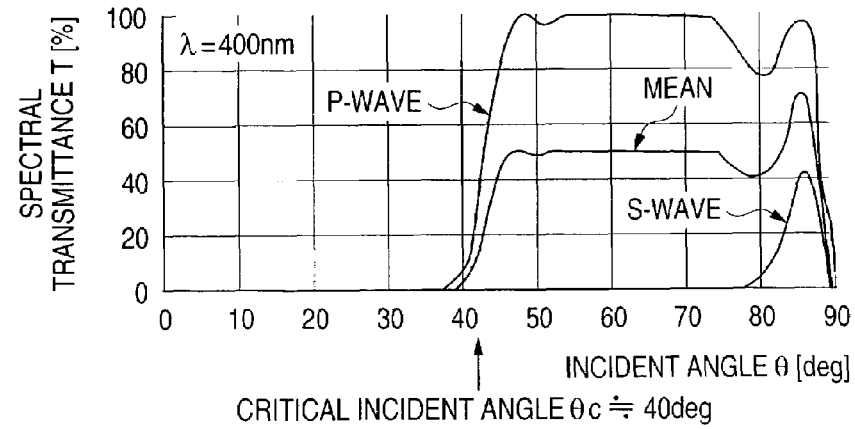
Figure 31:
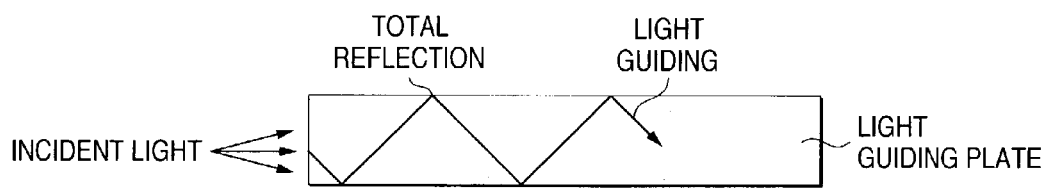
FIGS. 31(a) to 31(c) show the views showing a state in which an incident light is introduced from a general light guiding plate and waveguide according to the conventional art.
Figure 31:
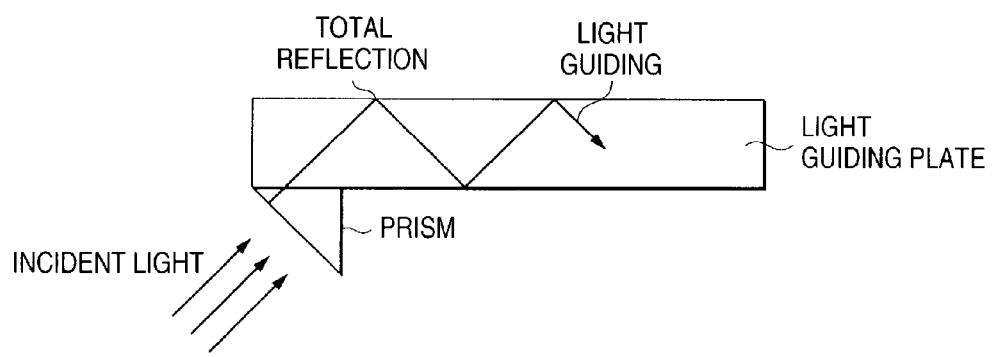
Figure 31:
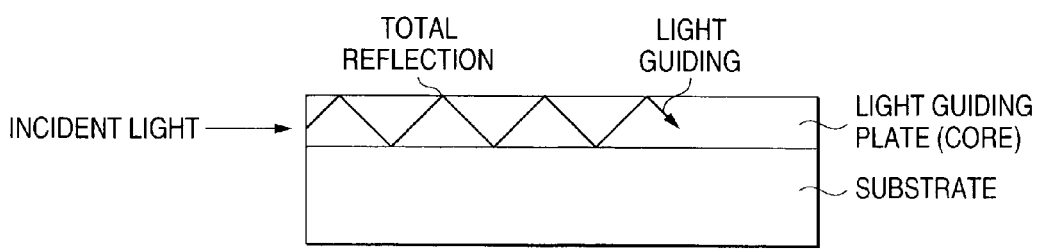

The spectral transmittance of an optical device (a dielectric multilayer film) was calculated under the condition described above so that results shown in FIGS. 29 and 30 were obtained. FIG. 29 is a graph showing a change in a spectral transmittance T for the wavelength $\lambda$ every incidence angle $\theta$ and FIG. 30 is a graph showing the spectral transmittance T for the incidence angle $\theta$ every wavelength $\lambda$.

As shown in FIG. 29(a), in the case in which the incidence angle $\theta$ is 0 [deg], the spectral transmittance T in the wavelength area of the UV light source is approximately 0 [%] and a light is not transmitted through the optical device. Also in the case in which the incidence angle $\theta$ is 40 [deg] immediately before the total reflecting critical angle $\theta_c$ as shown in FIG. 29(b), moreover, the light is not transmitted through the optical device. In the case in which the incidence angle $\theta$ is 70 [deg] as shown in FIG. 29(c), a spectral transmittance of approximately 100 [%] is obtained for a P wave and a spectral transmittance of approximately 0 [%] is obtained for an S wave, and the average of the P wave and the S wave is approximately 50 [%].

Moreover, in the case in which a wavelength on the short-wavelength side in the wavelength area of the UV light source is set to be $\lambda$=350 [nm] as shown in FIG. 30(a), the spectral transmittance for the P wave is enhanced with an incidence angle $\theta$ of approximately 50 [deg] or more. In the case in which a central wavelength is set to be $\lambda$=375 [nm] shown in FIG. 30(b), the spectral transmittance is enhanced with an incidence angle $\theta$ of approximately 46 [deg] or more. Furthermore, in the case in which a wavelength on the long-wavelength side is set to be $\lambda$=400 [nm] shown in FIG. 30(c), the spectral transmittance is enhanced with an incidence angle $\theta$ of approximately 42 [deg] or more.

By carrying out a total reflection through the optical device using the P wave or changing various conditions of the optical device to properly design the spectral characteristic of the S wave into a close characteristic to the P wave, it is possible to selectively reflect an incident light in the wavelength area of the UV light source at the incidence angle $\theta$ which is equal to or smaller than the total reflecting critical angle $\theta_c$ and to transmit the same incident light at a greater angle than the total reflecting critical angle $\theta_c$. Consequently, the dielectric multilayer film of the optical device can be caused to function as an optical element for selecting an optical path sufficiently in practical use.

While the invention has been described in detail with reference to the specific embodiments, it is apparent to the skilled in the art that various changes and modifications can be made without departing from the spirit and scope of the invention.

The invention is based on Japanese Patent Application (JP-A-2000-374527) filed in Dec. 8, 2000 and contents thereof are incorporated herein by reference.

INDUSTRIAL APPLICABILITY

According to the invention, the optical device is plane-shaped. When an incident light is introduced like a plane into the optical device, at least a part of the incident light thus introduced is totally reflected by the interface of layers constituting the optical device and is then returned to the incident light introduction side, and the incident light introduced into the optical device is not substantially emitted from the opposite side to the incident light introduction side. For this reason, the introducing position of the incident light is not restricted, for example, the incident light does not need to be introduced at a greater angle than the total reflecting critical angle from the end face of the optical device, and furthermore, the type of the light source is not limited, for example, the incident light does not need to take the shape of a beam or a line. Consequently, the planar incident light can be introduced like a plane directly and efficiently without using a light guiding plate or an optical waveguide, and a planar total reflected light can be obtained efficiently on a desirable interface. Moreover, since at least a part of the incident light introduced into the optical device is reflected by a total reflection, the optical device can be caused to function as an efficient reflector having neither an incidence angle dependency nor an absorption.

In the optical device according to the invention, moreover, the optical element for changing an optical path is provided in the optical device and the incident light is introduced like a plane into the optical element for changing an optical path. The optical path for the incident light thus introduced is changed into a specific direction or an optional direction by the optical element for changing an optical path, and the substantially whole incident light is reflected through the total reflection by the interface of the layers constituting the optical device. According to the structure, the introducing position of the incident light is not restricted and the type of the light source is not limited, and the planar incident light can be introduced like a plane directly and efficiently without using a light guiding plate or an optical waveguide.

Moreover, the optical device can be caused to function as an efficient reflector having neither an incidence angle dependency nor an absorption.

In the optical device according to the invention, furthermore, the optical element for selecting an optical path is provided in the optical device and the incident light is introduced like a plane into the optical element for selecting an optical path. The optical path for the incident light thus introduced is changed into a specific direction or an optional direction by the optical element for selecting an optical path, and the substantially whole incident light is reflected through the total reflection by the interface of the layers constituting the optical device. According to the structure, the introducing position of the incident light is not restricted and the type of the light source is not limited, and the planar incident light can be introduced like a plane directly and efficiently without using a light guiding plate or an optical waveguide. Moreover, the optical device can be caused to function as an efficient reflector having neither an incidence angle dependency nor an absorption.

In the optical device according to the invention, moreover, the optical element for changing an optical path and the optical element for selecting an optical path are provided in this order from the incident light introduction side in the direction of the thickness of the optical device, and the incident light is introduced like a plane into the optical element for changing an optical path. The optical path for the incident light thus introduced is changed into a specific direction or an optional direction by the optical element for changing an optical path, and furthermore, only the incident light in the specific direction is transmitted through the optical element for selecting an optical path so that the substantially whole light introduced into the optical device is reflected through the total reflection by the interface of the layers constituting the optical device. Also in such a structure, the introducing position of the incident light is not restricted and the type of the light source is not limited, and the planar incident light can be introduced like a plane directly and efficiently without using a light guiding plate or an optical waveguide. Moreover, the optical device can be caused to function as an efficient reflector having neither an incidence angle dependency nor an absorption.

In the optical device according to the invention, furthermore, the optical element for introducing an incident light to be totally reflected by the interface of the layers constituting the optical device is provided in the optical device and the incident light is introduced like a plane into the optical element for introducing the incident light. The incident light thus introduced is reflected through the total reflection by the interface of the layers constituting the optical device. With a simple structure, consequently, the introducing position of the incident light is not restricted and the type of the light source is not limited, and the planar incident light can be introduced like a plane directly and efficiently without using a light guiding plate or an optical waveguide. Moreover, the optical device can be caused to function as an efficient reflector having neither an incidence angle dependency nor an absorption.

What is claimed is:

1. A planar optical device characterized in that an optical element for changing an optical path and an optical element for selecting an optical path are provided in this order from an incident light introduction side in a direction of a thickness of the optical device, a transparent medium is provided in the optical device, and when an incident light is introduced like a plane into the optical element for changing an optical path, at least a part of the incident light thus introduced is introduced into the optical element for selecting an optical path and the substantially whole incident light thus introduced is reflected through a Total Internal Reflection (TIR) by an interface of layers constituting the optical device, wherein the incident light is totally reflected through the TIR by the interface of layers when the incident light has a greater angle component than a total reflecting critical angle, and wherein the optical element for changing an optical path includes and forward outputs a light having an angle $\theta t$ to satisfy at least a condition of $\sin \theta t > nw/nt$, in which nt represents a mean refractive index of the optical element for changing an optical path, nw represents a refractive index of a medium on a forward side of a total reflecting interface in a front part of the optical path, and $\theta t$ represents an angle of a light advancing in a medium of the optical element for changing an optical path.

2. A planar optical device characterized in that an optical element for selecting an optical path and a transparent medium are provided in the optical device, and at least a part of a planar incident light introduced in the optical device is introduced into the optical element for selecting an optical path and the substantially whole incident light thus introduced is totally reflected through a Total Internal Reflection (TIR) by an interface of layers constituting the optical device, wherein the incident light is totally reflected through the TIR by the interface of layers when the incident light has a greater angle component than a total reflecting critical angle, wherein the optical element for selecting an optical path is a light interference filter including a dielectric multilayer film, and wherein the dielectric multilayer film comprises any one of an electron beam coevaporated film or a sputtered film.

3. A planar optical device characterized in that an optical element for changing an optical path and an optical element for selecting an optical path are provided in this order from an incident light introduction side in a direction of a thickness of the optical device, a transparent medium is provided in the optical device, and when an incident light is introduced like a plane into the optical element for changing an optical path, at least a part of the incident light thus introduced is introduced into the optical element for selecting an optical path and the substantially whole incident light thus introduced is reflected through a Total Internal Reflection (TIR) by an interface of layers constituting the optical device, wherein the incident light is totally reflected through the TIR by the interface of layers when the incident light has a greater angle component than a total reflecting critical angle, wherein the optical element for selecting an optical path is a light interference filter including a dielectric multilayer film, and wherein the dielectric multilayer film comprises any one of an electron beam coevaporated film or a sputtered film.

4. A planar optical device characterized in that an optical element for changing an optical path is provided in the optical device, and at least a part of a planar incident light introduced in the optical device is introduced into the optical element for changing an optical path and the substantially whole incident light thus introduced is totally reflected through a Total Internal Reflection (TIR) by an interface of layers constituting the optical device, wherein a medium constituting a part of the optical device is provided in a frontmost part of the optical path of the optical device, and a front or rear interface of an optical path for an incident light of the medium is set to be an interface generating the TIR, and wherein, for the interface generating the TIR, a rear part of the optical path for the incident light is selected with na>nb if $\sin^{-1}(nb/na) \leq \theta$ is set, and a front part of the optical path for the incident light is selected with na>nb if $\sin^{-1}(1/na) < \theta < \sin^{-1}(nb/na)$ is set, and the front part of the optical path for the incident light is selected with na≦nb if $\sin^{-1}(1/na) \leq \theta$ is set, in which nb represents a mean refractive index of the medium, na represents a mean refractive index of a layer provided in the rear part of the optical path of the medium, and θ represents an angle of a light advancing in the layer of the rear part of the optical path.

5. A planar optical device characterized in that an optical element for selecting an optical path is provided in the optical device, and at least a part of a planar incident light introduced in the optical device is introduced into the optical element for selecting an optical path and the substantially whole incident light thus introduced is totally reflected through a Total Internal Reflection (TIR) by an interface of layers constituting the optical device, wherein a medium constituting a part of the optical device is provided in a frontmost part of the optical path of the optical device, and a front or rear interface of an optical path for an incident light of the medium is set to be an interface generating the TIR, and wherein, for the interface generating the TIR, a rear part of the optical path for the incident light is selected with na>nb if $\sin^{-1}(nb/na) \leq \theta$ is set, and a front part of the optical path for the incident light is selected with na>nb if $\sin^{-1}(1/na) < \theta < \sin^{-1}(nb/na)$ is set, and the front part of the optical path for the incident light is selected with na≦nb if $\sin^{-1}(1/na) \leq \theta$ is set, in which nb represents a mean refractive index of the medium, na represents a mean refractive index of a layer provided in the rear part of the optical path of the medium, and θ represents an angle of a light advancing in the layer of the rear part of the optical path.

6. A planar optical device characterized in that an optical element for changing an optical path and an optical element for selecting an optical path are provided in this order from an incident light introduction side in a direction of a thickness of the optical device, and when an incident light is introduced like a plane into the optical element for changing an optical path, at least a part of the incident light thus introduced is introduced into the optical element for selecting an optical path and the substantially whole incident light thus introduced is reflected through a Total Internal Reflection (TIR) by an interface of layers constituting the optical device, wherein a medium constituting a part of the optical device is provided in a frontmost part of the optical path of the optical device, and a front or rear interface of an optical path for an incident light of the medium is set to be an interface generating the TIR, and wherein, for the interface generating the TIR, a rear part of the optical path for the incident light is selected with na>nb if $\sin^{-1}(nb/na) \leq \theta$ is set, and a front part of the optical path for the incident light is selected with na>nb if $\sin^{-1}(1/na) < \theta < \sin^{-1}(nb/na)$ is set, and the front part of the optical path for the incident light is selected with na≦nb if $\sin^{-1}(1/na) \leq \theta$ is set, in which nb represents a mean refractive index of the medium, na represents a mean refractive index of a layer provided in the rear part of the optical path of the medium, and θ represents an angle of a light advancing in the layer of the rear part of the optical path.

7. A planar optical device characterized in that an optical element for changing an optical path is provided in the optical device, and at least a part of a planar incident light introduced in the optical device is introduced into the optical element for changing an optical path and the substantially whole incident light thus introduced is totally reflected through a Total Internal Reflection (TIR) by an interface of layers constituting the optical device, wherein the optical element for changing an optical path includes and forward outputs a light having an angle θt to satisfy at least a condition of $\sin \theta t > nw/nt$, in which nt represents a mean refractive index of the optical element for changing an optical path, nw represents a refractive index of a medium on a forward side of a total reflecting interface in a front part of the optical path, and θt represents an angle of a light advancing in a medium of the optical element for changing an optical path.

8. A planar optical device characterized in that an optical element for changing an optical path and an optical element for selecting an optical path are provided in this order from an incident light introduction side in a direction of a thickness of the optical device, and when an incident light is introduced like a plane into the optical element for changing an optical path, at least a part of the incident light thus introduced is introduced into the optical element for selecting an optical path and the substantially whole incident light thus introduced is reflected through a Total Internal Reflection (TIR) by an interface of layers constituting the optical device, wherein the optical element for changing an optical path includes and forward outputs a light having an angle θt to satisfy at least a condition of $\sin \theta t > nw/nt$, in which nt represents a mean refractive index of the optical element for changing an optical path, nw represents a refractive index of a medium on a forward side of a total reflecting interface in a front part of the optical path, and θt represents an angle of a light advancing in a medium of the optical element for changing an optical path.

9. A planar optical device characterized in that an optical element for selecting an optical path and a transparent medium are provided in the optical device, and at least a part of a planar incident light introduced in the optical device is introduced into the optical element for selecting an optical path and the substantially whole incident light thus introduced is totally reflected through a Total Internal Reflection (TIR) by an interface of layers constituting the optical device, wherein the incident light is totally reflected through the TIR by the interface of layers when the incident light has a greater angle component than a total reflecting critical angle, and wherein the optical element for selecting an optical path has such a feature that a substantially whole transmitted light which is emitted from the optical element has a greater angle component than a total reflecting critical angle on an interface of layers in a front part of an optical path for the incident light from the optical element for selecting an optical path or an interface in a front part of the optical path for the incident light of the optical element for selecting an optical path and incident lights having other angle components are selectively reflected and are not transmitted.

10. A planar optical device characterized in that an optical element for changing an optical path and an optical element for selecting an optical path are provided in this order from an incident light introduction side in a direction of a thickness of the optical device, a transparent medium is provided in the optical device, and when an incident light is introduced like a plane into the optical element for changing an optical path, at least a part of the incident light thus introduced is introduced into the optical element for selecting an optical path and the substantially whole incident light thus introduced is reflected through a Total Internal Reflection (TIR) by an interface of layers constituting the optical device, wherein the incident light is totally reflected through the TIR by the interface of layers when the incident light has a greater angle component than a total reflecting critical angle, and wherein the optical element for selecting an optical path has such a feature that a substantially whole transmitted light which is emitted from the optical element has a greater angle component than a total reflecting critical angle on an interface of layers in a front part of an optical path for the incident light from the optical element for selecting an optical path or an interface in a front part of the optical path for the incident light of the optical element for selecting an optical path and incident lights having other angle components are selectively reflected and are not transmitted.

11. A planar optical device characterized in that an optical element for selecting an optical path and a transparent medium are provided in the optical device, and at least a part of a planar incident light introduced in the optical device is introduced into the optical element for selecting an optical path and the substantially whole incident light thus introduced is totally reflected through a Total Internal Reflection (TIR) by an interface of layers constituting the optical device, wherein the incident light is totally reflected through the TIR by the interface of layers when the incident light has a greater angle component than a total reflecting critical angle, and wherein the optical element for selecting an optical path transmits a substantially whole light having an angle θs to satisfy a condition of sin θs>nw/ns, in which ns represents a mean refractive index of the optical element for selecting an optical path, nw represents a refractive index of a medium on a forward side of a total reflecting interface in a front part of the optical path, and θs represents an angle of a light advancing in the medium of the optical element for selecting an optical path.

12. A planar optical device characterized in that an optical element for changing an optical path and an optical element for selecting an optical path are provided in this order from an incident light introduction side in a direction of a thickness of the optical device, a transparent medium is provided in the optical device, and when an incident light is introduced like a plane into the optical element for changing an optical path, at least a part of the incident light thus introduced is introduced into the optical element for selecting an optical path and the substantially whole incident light thus introduced is reflected through a Total Internal Reflection (TIR) by an interface of layers constituting the optical device, wherein the incident light is totally reflected through the TIR by the interface of layers when the incident light has a greater angle component than a total reflecting critical angle, and wherein the optical element for selecting an optical path transmits a substantially whole light having an angle θs to satisfy a condition of sin θs>nw/ns, in which ns represents a mean refractive index of the optical element for selecting an optical path, nw represents a refractive index of a medium on a forward side of a total reflecting interface in a front part of the optical path, and θs represents an angle of a light advancing in the medium of the optical element for selecting an optical path.

13. A planar optical device characterized in that an optical element for selecting an optical path and a transparent medium are provided in the optical device, and at least a pan of a planar incident light introduced in the optical device is introduced into the optical element for selecting an optical path and the substantially whole incident light thus introduced is totally reflected through a Total Internal Reflection (TIR) by an interface of layers constituting the optical device, wherein the incident light is totally reflected through the TIR by the interface of layers when the incident light has a greater angle component than a total reflecting critical angle, and wherein the optical element for selecting an optical path has a function of selectively carrying out a reflection for a wavelength area of an incident light, and a wavelength of the incident light to be reflected selectively is shifted toward a short-wavelength side when an incidence angle of the incident light on the optical element for selecting an optical path is reduced with respect to a surface of the optical element.

14. A planar optical device characterized in that an optical element for changing an optical path and an optical element for selecting an optical path are provided in this order from an incident light introduction side in a direction of a thickness of the optical device, a transparent medium is provided in the optical device, and when an incident light is introduced like a plane into the optical element for changing an optical path, at least a part of the incident light thus introduced is introduced into the optical element for selecting an optical path and the substantially whole incident light thus introduced is reflected through a Total Internal Reflection (TIR) by an interface of layers constituting the optical device, wherein the incident light is totally reflected though the TIR by the interface of layers when the incident light has a greater angle component than a total reflecting critical angle, and wherein the optical element for selecting an optical path has a function of selectively carrying out a reflection for a wavelength area of an incident light, and a wavelength of the incident light to be reflected selectively is shifted toward a short-wavelength side when an incidence angle of the incident light on the optical element for selecting an optical path is reduced with respect to a surface of the optical element.

15. The optical device according to claims 9 or 10, wherein the substantially whole incident light which is reflected totally through the TIR is returned to the incident light introduction side of the optical device.

16. The optical device according to claims 9 or 10, wherein the layer constituting the optical device is not substantially absorbed into a wavelength area of the incident light.

17. The optical device according to claim 10, wherein the optical element for changing an optical path and the optical element for selecting an optical path are provided in this order in a front part of an optical path of the transparent medium.

18. The optical device according to claims 9 or 10, wherein a medium constituting a part of the optical device is provided in a frontmost part of the optical path of the optical device, and a front or rear interface of an optical path for an incident light of the medium is set to be an interface generating the TIR.

19. The optical device according to claim 18, wherein, for the interface generating the TIR, a rear part of the optical path for the incident light is selected with na>nb if $\sin^{-1}$ (nb/na)$\leq\theta$ is set, and a front part of the optical path for the incident light is selected with na>nb if $\sin^{-1}$ (1/na)$<\theta<\sin^{-1}$ (nb/na) is set, and the front part of the optical path for the incident light is selected with na$\leq$nb if $\sin^{-1}$ (1/na)$\leq\theta$ is set,
in which nb represents a mean refractive index of the medium, na represents a mean refractive index of a layer provided in the rear part of the optical path of the medium, and $\theta$ represents an angle of a light advancing in the layer of the rear part of the optical path.

20. The optical device according to claim 10, wherein the optical element for changing an optical path serves to change the optical path by a refraction.

21. The optical device according to claim 20, wherein the optical element for changing an optical path is any of a lens array, a prism array and a heterorefractive index distribution member having various refractive indices distributed.

22. The optical device according to claim 10, wherein the optical element for changing an optical path serves to change the optical path by a diffraction.

23. The optical device according to claim 22, wherein the optical element for changing an optical path is any of a volume hologram, a phase modulation type diffraction grating and an amplitude modulation type diffraction grating.

24. The optical device according to claim 10, wherein the optical element for changing an optical path serves to change an optical path by a light diffusion.

25. The optical device according to claim 24, wherein the optical element for changing an optical path is a porous member, a heterorefractive index distribution member, a dispersion member, a diffusion member having a concavo-convex surface or a scattering member.

26. The optical device according to claim 10, wherein the optical element for changing an optical path serves to change an optical path by a light reflection.

27. The optical device according to claims 9 or 10, wherein the optical element for selecting an optical path is a light interference filter including a dielectric multilayer film.

28. The optical device according to claims 9 or 10, wherein the optical element for selecting an optical path is a Bragg reflecting filter including a cholesteric liquid crystal and a volume hologram.

29. The optical device according to claims 9 or 10, wherein the incident light is a collimated light ranging within a specific incidence angle.

30. The optical device according to claims 9 or 10, wherein the incident light is a diffused light having an optional incidence angle.

31. The optical device according to claims 9 or 10, wherein a light source is provided in the optical device and the incident light is emitted from the light source.

32. The optical device according to claims 9 or 10, wherein a reflector for transmitting, toward the optical device side again, a light which is once incident on the optical device and is reflected by the optical device is provided opposite to an incident light introduction side of the optical device.

33. The optical device according to claims 9 or 10, wherein the incident light is any of a UV light, a visible light and an infrared light.

34. The optical device according to claims 9 or 10, wherein the incident light is emitted from any of a discharge lamp, a laser beam source, a LED, an inorganic or organic EL, an incandescent lamp, a cathode-ray lamp and an FED.

35. The optical device according to claim 9,
wherein the optical element for selecting an optical path is a light interference filter including a dielectric multilayer film, and
wherein the dielectric multilayer film comprises an organic multilayer film.

36. The optical device according to claim 10,
wherein the optical element for selecting an optical path is a light interference filter including a dielectric multilayer film, and
wherein the dielectric multilayer film comprises an organic multilayer film.

37. The optical device according to claim 11, wherein the substantially whole incident light which is reflected totally through the TIR is returned to the incident light introduction side of the optical device.

38. The optical device according to claim 11, wherein the layer constituting the optical device is not substantially absorbed into a wavelength area of the incident light.

39. The optical device according to claim 11, wherein the optical element for changing an optical path and the optical element for selecting an optical path are provided in this order in a front part of an optical path of the transparent medium.

40. The optical device according to claim 11, wherein a medium constituting a part of the optical device is provided in a frontmost part of the optical path of the optical device, and a front or rear interface of an optical path for an incident light of the medium is set to be an interface generating the TIR.

41. The optical device according to claim 11, wherein, for the interface generating the TIR, a rear part of the optical path for the incident light is selected with na>nb if $\sin^{-1}$ (nb/na)$\leq\theta$ is set, and a front part of the optical path for the incident light is selected with na>nb if $\sin^{-1}$ (1/na)$<\theta<\sin^{-1}$ (nb/na) is set, and the front part of the optical path for the incident light is selected with na$\leq$nb if $\sin^{-1}$ (1/na)$\leq\theta$ is set,
in which nb represents a mean refractive index of the medium, na represents a mean refractive index of a layer provided in the rear part of the optical path of the medium, and $\theta$ represents an angle of a light advancing in the layer of the rear part of the optical path.

42. The optical device according to claim 11, wherein the optical element for changing an optical path includes and forward outputs a light having an angle $\theta t$ to satisfy at least a condition of $\sin \theta t > nw/nt$, in which nt represents a mean refractive index of the optical element for changing an optical path, nw represents a refractive index of a medium on a forward side of a total reflecting interface in a front part of the optical path, and θt represents an angle of a light advancing in a medium of the optical element for changing an optical path.

43. The optical device according to claim 11, wherein the optical element for changing an optical path serves to change the optical path by a refraction.

44. The optical device according to claim 11, wherein the optical element for changing an optical path is any of a lens array, a prism array and a heterorefractive index distribution member having various refractive indices distributed.

45. The optical device according to claim 11, wherein the optical element for changing an optical path serves to change the optical path by a diffraction.

46. The optical device according to claim 11, wherein the optical element for changing an optical path is any of a volume hologram, a phase modulation type diffraction grating and an amplitude modulation type diffraction grating.

47. The optical device according to claim 11, wherein the optical element for changing an optical path is a porous member, a heterorefractive index distribution member, a dispersion member, a diffusion member having a concavo-convex surface or a scattering member.

48. The optical device according to claim 11, wherein when an incidence angle of the incident light on a total reflecting interface in a front part of an optical path for the incident light in the optical element for selecting an optical path is equal to or smaller than a total reflecting critical angle, the optical element for selecting an optical path selectively reflects the substantially whole incident light.

49. The optical device according to claim 11, wherein the optical element for selecting an optical path is a light interference filter including a dielectric multilayer film.

50. The optical device according to claim 11, wherein the optical element for selecting an optical path is a Bragg reflecting filter including a cholesteric liquid crystal and a volume hologram.

51. The optical device according to claim 11, wherein the incident light is a collimated light ranging within a specific incidence angle.

52. The optical device according to claim 11, wherein the incident light is a diffused light having an optional incidence angle.

53. The optical device according to claim 11, wherein a light source is provided in the optical device and the incident light is emitted from the light source.

54. The optical device according to claim 11, wherein a reflector for transmitting, toward the optical device side again, a light which is once incident on the optical device and is reflected by the optical device is provided opposite to an incident light introduction side of the optical device.

55. The optical device according to claim 11, wherein the incident light is any of a UV light, a visible light and an infrared light.

56. The optical device according to claim 11, wherein the incident light is emitted from any of a discharge lamp, a laser beam source, a LED, an inorganic or organic EL, an incandescent lamp, a cathode-ray lamp and an FED.

57. The optical device according to claim 11,
wherein the optical element for selecting an optical path is a light interference filter including a dielectric multilayer film, and
wherein the dielectric multilayer film comprises any one of an electron beam coevaporated film or a sputtered film.

58. The optical device according to claim 12, wherein the substantially whole incident light which is reflected totally through the TIR is returned to the incident light introduction side of the optical device.

59. The optical device according to claim 12, wherein the layer constituting the optical device is not substantially absorbed into a wavelength area of the incident light.

60. The optical device according to claim 12, wherein the optical element for changing an optical path and the optical element for selecting an optical path are provided in this order in a front part of an optical path of the transparent medium.

61. The optical device according to claim 12, wherein a medium constituting a part of the optical device is provided in a frontmost part of the optical path of the optical device, and a front or rear interface of an optical path for an incident light of the medium is set to be an interface generating the TIR.

62. The optical device according to claim 12, wherein, for the interface generating the TIR, a rear part of the optical path for the incident light is selected with na>nb if $\sin^{-1}$ (nb/na)<θ is set, and a front part of the optical path for the incident light is selected with na>nb if $\sin^{-1}$ (1/na)<θ<$\sin^{-1}$ (nb/na) is set, and
the front part of the optical path for the incident light is selected with na≦nb if $\sin^{-1}$ (1/na)≦θ is set,
in which nb represents a mean refractive index of the medium, na represents a mean refractive index of a layer provided in the rear part of the optical path of the medium, and θ represents an angle of a light advancing in the layer of the rear part of the optical path.

63. The optical device according to claim 12, wherein the optical element for changing an optical path includes and forward outputs a light having an angle θt to satisfy at least a condition of sin θt>nw/nt, in which nt represents a mean refractive index of the optical element for changing an optical path, nw represents a refractive index of a medium on a forward side of a total reflecting interface in a front part of the optical path, and θt represents an angle of a light advancing in a medium of the optical element for changing an optical path.

64. The optical device according to claim 12, wherein the optical element for changing an optical path serves to change the optical path by a refraction.

65. The optical device according to claim 12, wherein the optical element for changing an optical path is any of a lens array, a prism array and a heterorefractive index distribution member having various refractive indices distributed.

66. The optical device according to claim 12, wherein the optical element for changing an optical path serves to change the optical path by a diffraction.

67. The optical device according to claim 12, wherein the optical element for changing an optical path is any of a volume hologram, a phase modulation type diffraction grating and an amplitude modulation type diffraction grating.

68. The optical device according to claim 12, wherein the optical element for changing an optical path serves to change an optical path by a light diffusion.

69. The optical device according to claim 12, wherein the optical element for changing an optical path is a porous member, a heterorefractive index distribution member, a dispersion member, a diffusion member having a concavo-convex surface or a scattering member.

70. The optical device according to claim 12, wherein the optical element for changing an optical path serves to change an optical path by a light reflection.

71. The optical device according to claim 12, wherein when an incidence angle of the incident light on a total reflecting interface in a front part of an optical path for the incident light in the optical element for selecting an optical path is equal to or smaller than a total reflecting critical angle, the optical element for selecting an optical path selectively reflects the substantially whole incident light.

72. The optical device according to claim 12, wherein the optical element for selecting an optical path is a light interference filter including a dielectric multilayer film.

73. The optical device according to claim 12, wherein the optical element for selecting an optical path is a Bragg reflecting filter including a cholesteric liquid crystal and a volume hologram.

74. The optical device according to claim 12, wherein the incident light is a collimated light ranging within a specific incidence angle.

75. The optical device according to claim 12, wherein the incident light is a diffused light having an optional incidence angle.

76. The optical device according to claim 12, wherein a light source is provided in the optical device and the incident light is emitted from the light source.

77. The optical device according to claim 12, wherein the incident light is incident from an outside of the optical device.

78. The optical device according to claim 12, wherein a reflector for transmitting, toward the optical device side again, a light which is once incident on the optical device and is reflected by the optical device is provided opposite to an incident light introduction side of the optical device.

79. The optical device according to claim 12, wherein the incident light is any of a UV light, a visible light and an infrared light.

80. The optical device according to claim 12, wherein the incident light is emitted from any of a discharge lamp, a laser beam source, a LED, an inorganic or organic EL, an incandescent lamp, a cathode-ray lamp and an FED.

81. The optical device according to claim 12,
wherein the optical element for selecting an optical path is a light interference filter including a dielectric multilayer film, and
wherein the dielectric multilayer film comprises any one of an electron beam coevaporated film or a sputtered film.

82. The optical device according to claim 13, wherein the substantially whole incident light which is reflected totally through the TIR is returned to the incident light introduction side of the optical device.

83. The optical device according to claim 13, wherein the layer constituting the optical device is not substantially absorbed into a wavelength area of the incident light.

84. The optical device according to claim 13, wherein the optical element for changing an optical path and the optical element for selecting an optical path are provided in this order in a front part of an optical path of the transparent medium.

85. The optical device according to claim 13, wherein a medium constituting a part of the optical device is provided in a frontmost part of the optical path of the optical device, and a front or rear interface of an optical path for an incident light of the medium is set to be an interface generating the TIR.

86. The optical device according to claim 13, wherein, for the interface generating the TIR, a rear part of the optical path for the incident light is selected with na>nb if $\sin^{-1}$ (nb/na)≦θ is set, and a front part of the optical path for the incident light is selected with na>nb if $\sin^{-1}$ (1/na)<θ<$\sin^{-1}$ (nb/na) is set, and
the front part of the optical path for the incident light is selected with na≦nb if $\sin^{-1}$ (1/na)≦θ is set,
in which nb represents a mean refractive index of the medium, na represents a mean refractive index of a layer provided in the rear part of the optical path of the medium, and θ represents an angle of a light advancing in the layer of the rear part of the optical path.

87. The optical device according to claim 13, wherein the optical element for changing an optical path includes and forward outputs a light having an angle θt to satisfy at least a condition of sin θt>nw/nt, in which nt represents a mean refractive index of the optical element for changing an optical path, nw represents a refractive index of a medium on a forward side of a total reflecting interface in a front part of the optical path, and θt represents an angle of a light advancing in a medium of the optical element for changing an optical path.

88. The optical device according to claim 13, wherein the optical element for changing an optical path serves to change the optical path by a refraction.

89. The optical device according to claim 13, wherein the optical element for changing an optical path is any of a lens array, a prism array and a heterorefractive index distribution member having various refractive indices distributed.

90. The optical device according to claim 13, wherein the optical element for changing an optical path serves to change the optical path by a diffraction.

91. The optical device according to claim 13, wherein the optical element for changing an optical path is any of a volume hologram, a phase modulation type diffraction grating and an amplitude modulation type diffraction grating.

92. The optical device according to claim 13, wherein the optical element for changing an optical path is a porous member, a heterorefractive index distribution member, a dispersion member, a diffusion member having a concavo-convex surface or a scattering member.

93. The optical device according to claim 13, wherein when an incidence angle of the incident light on a total reflecting interface in a front part of an optical path for the incident light in the optical element for selecting an optical path is equal to or smaller than a total reflecting critical angle, the optical element for selecting an optical path selectively reflects the substantially whole incident light.

94. The optical device according to claim 13, wherein the optical element for selecting an optical path is a light interference filter including a dielectric multilayer film.

95. The optical device according to claim 13, wherein the optical element for selecting an optical path is a Bragg reflecting filter including a cholesteric liquid crystal and a volume hologram.

96. The optical device according to claim 13, wherein the incident light is a collimated light ranging within a specific incidence angle.

97. The optical device according to claim 13, wherein the incident light is a diffused light having an optional incidence angle.

98. The optical device according to claim 13, wherein a light source is provided in the optical device and the incident light is emitted from the light source.

99. The optical device according to claim 13, wherein a reflector for transmitting, toward the optical device side again, a light which is once incident on the optical device and is reflected by the optical device is provided opposite to an incident light introduction side of the optical device.

100. The optical device according to claim 13, wherein the incident light is any of a UV light, a visible light and an infrared light.

101. The optical device according to claim 13, wherein the incident light is emitted from any of a discharge lamp, a laser beam source, a LED, an inorganic or organic EL, an incandescent lamp, a cathode-ray lamp and an FED.

102. The optical device according to claim 13,
wherein the optical element for selecting an optical path is a light interference filter including a dielectric multilayer film, and
wherein the dielectric multilayer film comprises any one of an electron beam coevaporated film or a sputtered film.

103. The optical device according to claim 14, wherein the substantially whole incident light which is reflected totally through the TIR is returned to the incident light introduction side of the optical device.

104. The optical device according to claim 14, wherein the layer constituting the optical device is not substantially absorbed into a wavelength area of the incident light.

105. The optical device according to claim 14, wherein the optical element for changing an optical path and the optical element for selecting an optical path are provided in this order in a front part of an optical path of the transparent medium.

106. The optical device according to claim 14, wherein a medium constituting a part of the optical device is provided in a frontmost part of the optical path of the optical device, and a front or rear interface of an optical path for an incident light of the medium is set to be an interface generating the TIR.

107. The optical device according to claim 14, wherein, for the interface generating the TIR, a rear part of the optical path for the incident light is selected with na>nb if $\sin^{-1}(nb/na) \leq \theta$ is set, and a front part of the optical path for the incident light is selected with na>nb if $\sin^{-1}(1/na) < \theta < \sin^{-1}(nb/na)$ is set, and
the front part of the optical path for the incident light is selected with na≤nb if $\sin^{-1}(1/na) \leq \theta$ is set,
in which nb represents a mean refractive index of the medium, na represents a mean refractive index of a layer provided in the rear part of the optical path of the medium, and θ represents an angle of a light advancing in the layer of the rear part of the optical path.

108. The optical device according to claim 14, wherein the optical element for changing an optical path includes and forward outputs a light having an angle θt to satisfy at least a condition of sin θt>nw/nt, in which nt represents a mean refractive index of the optical element for changing an optical path, nw represents a refractive index of a medium on a forward side of a total reflecting interface in a front part of the optical path, and θt represents an angle of a light advancing in a medium of the optical element for changing an optical path.

109. The optical device according to claim 14, wherein the optical element for changing an optical path serves to change the optical path by a refraction.

110. The optical device according to claim 14, wherein the optical element for changing an optical path is any of a lens array, a prism array and a heterorefractive index distribution member having various refractive indices distributed.

111. The optical device according to claim 14, wherein the optical element for changing an optical path serves to change the optical path by a diffraction.

112. The optical device according to claim 14, wherein the optical element for changing an optical path is any of a volume hologram, a phase modulation type diffraction grating and an amplitude modulation type diffraction grating.

113. The optical device according to claim 14, wherein the optical element for changing an optical path serves to change an optical path by a light diffusion.

114. The optical device according to claim 14, wherein the optical element for changing an optical path is a porous member, a heterorefractive index distribution member, a dispersion member, a diffusion member having a concavo-convex surface or a scattering member.

115. The optical device according to claim 14, wherein the optical element for changing an optical path serves to change an optical path by a light reflection.

116. The optical device according to claim 14, wherein when an incidence angle of the incident light on a total reflecting interface in a front part of an optical path for the incident light in the optical element for selecting an optical path is equal to or smaller than a total reflecting critical angle, the optical element for selecting an optical path selectively reflects the substantially whole incident light.

117. The optical device according to claim 14, wherein the optical element for selecting an optical path is a light interference filter including a dielectric multilayer film.

118. The optical device according to claim 14, wherein the optical element for selecting an optical path is a Bragg reflecting filter including a cholesteric liquid crystal and a volume hologram.

119. The optical device according to claim 14, wherein the incident light is a collimated light ranging within a specific incidence angle.

120. The optical device according to claim 14, wherein the incident light is a diffused light having an optional incidence angle.

121. The optical device according to claim 14, wherein a light source is provided in the optical device and the incident light is emitted from the light source.

122. The optical device according to claim 14, wherein the incident light is incident from an outside of the optical device.

123. The optical device according to claim 14, wherein a reflector for transmitting, toward the optical device side again, a light which is once incident on the optical device and is reflected by the optical device is provided opposite to an incident light introduction side of the optical device.

124. The optical device according to claim 14, wherein the incident light is any of a UV light, a visible light and an infrared light.

125. The optical device according to claim 14, wherein the incident light is emitted from any of a discharge lamp, a laser beam source, a LED, an inorganic or organic EL, an incandescent lamp, a cathode-ray lamp and an FED.

126. The optical device according to claim 14,
wherein the optical element for selecting an optical path is a light interference filter including a dielectric multilayer film, and
wherein the dielectric multilayer film comprises any one of an electron beam coevaporated film or a sputtered film.

* * * * *